United States Patent
Haraden et al.

(10) Patent No.: US 12,177,019 B2
(45) Date of Patent: *Dec. 24, 2024

(54) ERROR RECOVERY AND POWER MANAGEMENT BETWEEN NODES OF AN INTERCONNECTION NETWORK

(71) Applicant: Microsoft Technology Licensing, LLC, Redmond, WA (US)

(72) Inventors: Ryan Scott Haraden, Duvall, WA (US); Christopher Michael Babecki, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,143

(22) Filed: Aug. 30, 2023

(65) Prior Publication Data

US 2023/0412307 A1 Dec. 21, 2023

Related U.S. Application Data

(63) Continuation of application No. 17/963,473, filed on Oct. 11, 2022, now Pat. No. 11,784,754, which is a
(Continued)

(51) Int. Cl.
*H04L 1/08* (2006.01)
*H04L 1/00* (2006.01)

(52) U.S. Cl.
CPC .............. *H04L 1/08* (2013.01); *H04L 1/0072* (2013.01)

(58) Field of Classification Search
CPC ....... H04L 1/08; H04L 1/0072; H04L 1/0011; H04L 1/007; H04L 1/0057; H04L 1/0061;
(Continued)

(56) References Cited

U.S. PATENT DOCUMENTS 11,050,514 B1 * 6/2021 Haraden ............... H04L 1/0041
11,502,783 B2 * 11/2022 Haraden ............... H04L 1/0072
(Continued)

OTHER PUBLICATIONS

V. Rajendran, J. J. Garcia-Luna-Aceves and K. Obraczka, "Energy-efficient channel access scheduling for power-constrained networks," The 5th International Symposium on Wireless Personal Multimedia Communications, Honolulu, HI, USA, 2002, pp. 509-513 vol.2. (Year: 2002).*

*Primary Examiner* — Cynthia Britt
(74) *Attorney, Agent, or Firm* — Workman Nydegger

(57) ABSTRACT

Improved techniques for recovering from an error condition without requiring a re-transmittal of data across a high-speed data link and for improved power usage are disclosed herein. A data stream is initiated. This stream includes different types of packets. Error correcting code (ECC) is selectively imposed on a control data type packet. A transmitter node and a receiver node are connected via a hard link that has multiple virtual channels. Each virtual channel is associated with a corresponding power-consuming node. When the receiver node receives the control data type packet, error correction is performed if needed without re-transmittal. When a final data type packet is transmitted for each virtual channel, the transmitter node transmits an end condition type packet. A corresponding power-consuming node that corresponds to the respective virtual channel transitions from an active state to a low power state.

20 Claims, 19 Drawing Sheets

Related U.S. Application Data continuation of application No. 17/345,910, filed on Jun. 11, 2021, now Pat. No. 11,502,783, which is a continuation of application No. 16/880,018, filed on May 21, 2020, now Pat. No. 11,050,514.

(58) Field of Classification Search
CPC .......... H04L 1/0045; H04L 2001/0094; H04L 1/0041; Y02D 10/00; G06F 1/163; G06F 1/1698; G06F 3/011; G06F 1/3253

See application file for complete search history.

(56) References Cited

U.S. PATENT DOCUMENTS

| | | | | |
|---|---|---|---|---|
| 11,784,754 | B2 * | 10/2023 | Haraden | G06F 1/1698 714/748 |
| 2005/0207350 | A1 * | 9/2005 | Bloebaum | H04L 1/08 370/252 |
| 2011/0183698 | A1 * | 7/2011 | Hoctor | H04W 52/367 455/509 |

* cited by examiner

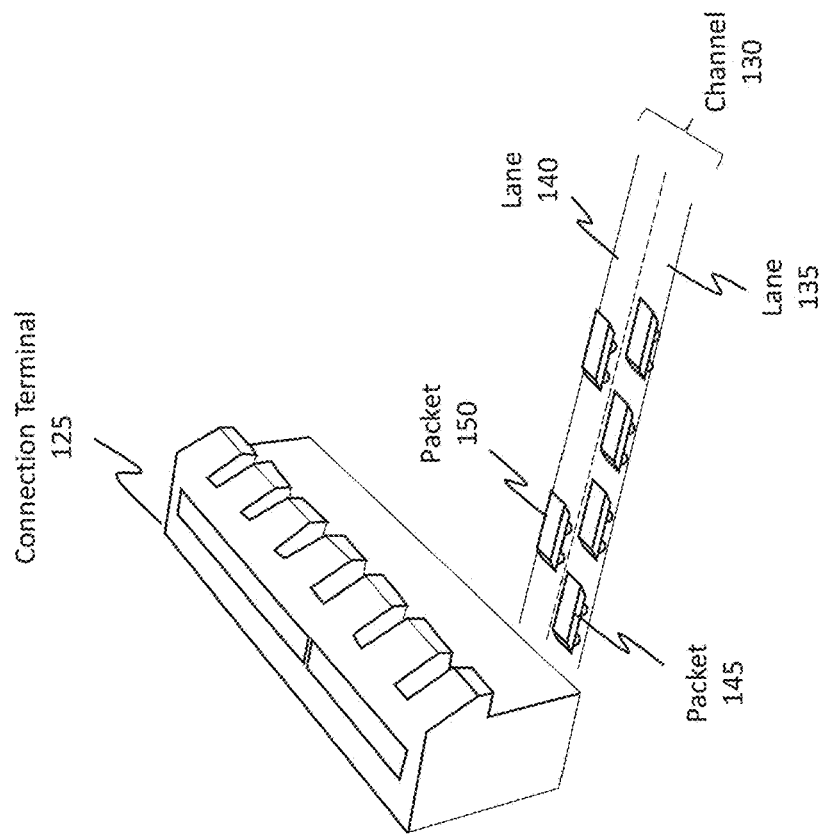
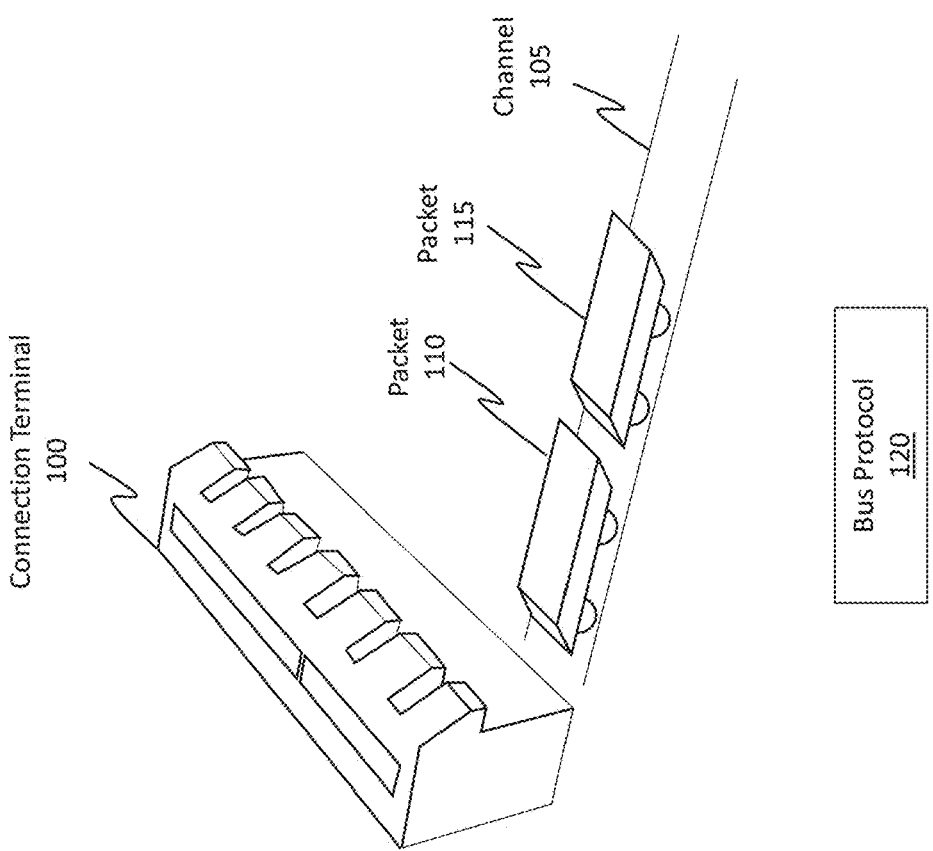
*Figure 1B*
*Figure 1A*

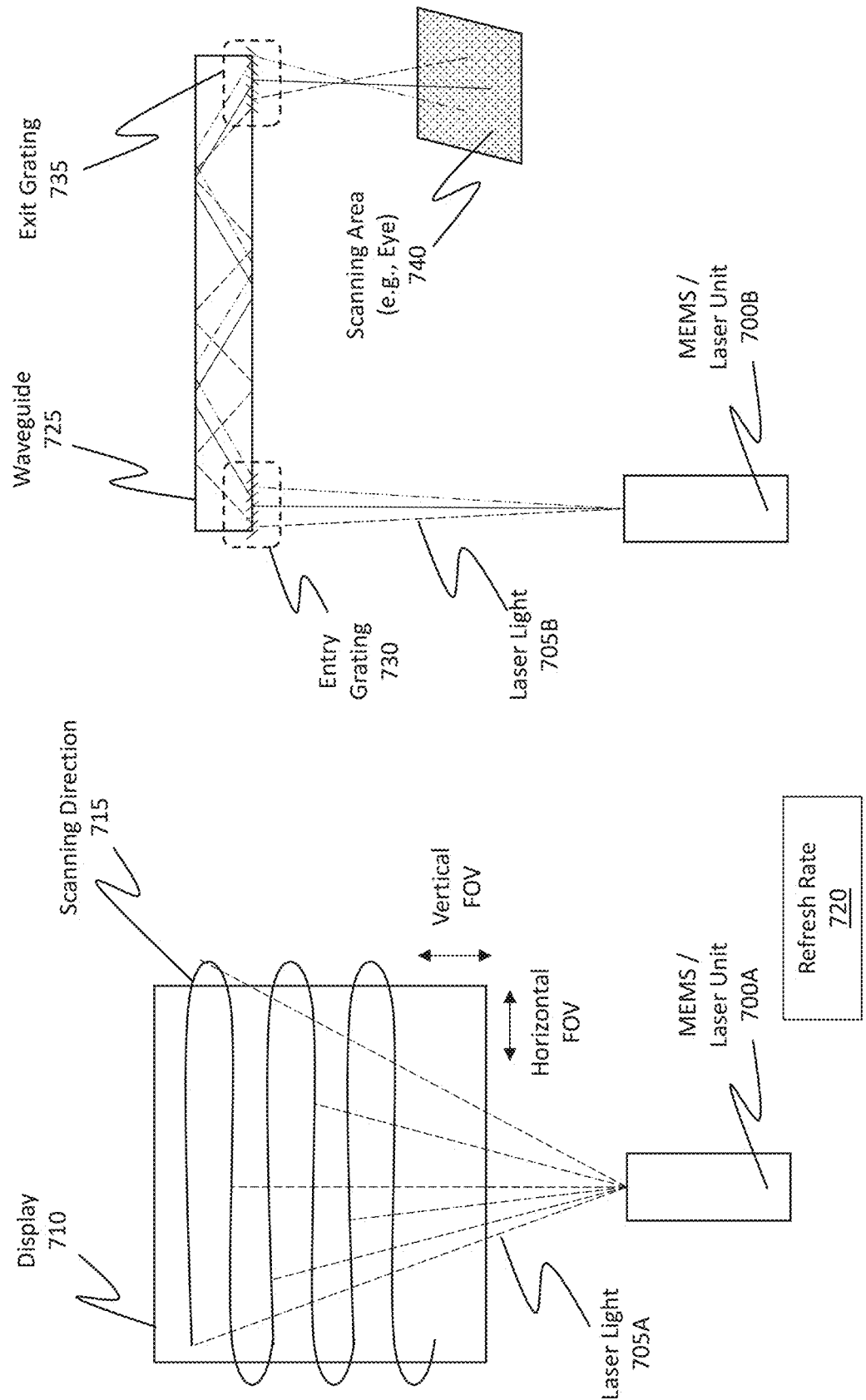

ERROR RECOVERY AND POWER MANAGEMENT BETWEEN NODES OF AN INTERCONNECTION NETWORK

CROSS-REFERENCE TO RELATED APPLICATIONS

This application is a continuation of U.S. patent application Ser. No. 17/963,473 filed on Oct. 11, 2022, entitled "ERROR RECOVERY AND POWER MANAGEMENT BETWEEN NODES OF AN INTERCONNECTION NETWORK," which is a continuation of U.S. patent application Ser. No. 17/345,910 filed on Jun. 11, 2021, entitled "ERROR RECOVERY AND POWER MANAGEMENT BETWEEN NODES OF AN INTERCONNECTION NETWORK," which issued as U.S. Pat. No. 11,502,783, which is a continuation of U.S. patent application Ser. No. 16/880,018 filed on May 21, 2020, entitled "ERROR RECOVERY AND POWER MANAGEMENT BETWEEN NODES OF AN INTERCONNECTION NETWORK," which issued as U.S. Pat. No. 11,050,514 on Jun. 9, 2021, which applications are expressly incorporated herein by reference in their entirety.

BACKGROUND

A computing architecture may comprise any number of interconnected nodes, such as CPUs, GPUs, NICs, Wi-Fi cards, memory, and so forth. These various nodes can be connected to one another via different types of connections, including wired connections or even wireless connections.

A wired connection is often referred to as a "hard link" and physically connects one node to another node. One type of wired connection (and specifically a type of bus protocol) is the PCIe (peripheral component interconnect express) connection. PCIe is a type of interface designed to connect high-speed nodes together. PCIe links come in numerous different configurations and may include differing numbers of "lanes" or "channels" which are paths through which data is permitted to travel from one node to another node. By way of example, PCIe links often have between 1 and 32 different lanes. FIG. 1 illustrates an example connection terminal 100, which may be any type of high-speed connection terminal, including PCIe. This connection terminal 100 is shown as including at least one channel 105 (aka a lane) as well as a number of packets (e.g., packet 110 and packet 115) traversing that channel 105. In this example illustration, the packets 110 and 115 are represented as vehicles to help with the following analogous description. The packets 110 and 115 travel the channel 105 in accordance with the bus protocol 120 the connection terminal 100 uses (e.g., the bus protocol 120 may be the PCIe protocol, or some other high-speed protocol).

In this example, the channel 105 can be thought of as a one-lane road on which cars (e.g., the packets 110 and 115) travel. With a one lane road, each subsequent car is limited by the speed of a preceding car. For instance, if the packet 110 were delayed for some reason on the channel 105, then the packet 115 will also be delayed. Increasing the number of channels allows for more data packets to be transmitted from one node to another node. For instance, if the connection terminal 100 were to include a second channel, then data packets could move across those two channels at two packets per cycle, and so on based on the number of channels.

With that basic understanding, it should now be noted how each channel (e.g., channel 105) typically has its own corresponding buffer. The reason packet 115 is not able to "pass" packet 110 is because packet 110 is currently allocated to the channel 105's buffer. Packet 115 is unable to use the buffer until such time as packet 110 is released from the buffer. Therefore, if packet 110 is blocked or remains idle while being allocated to the buffer, the subsequent packets will also remain idle. Increasing the number of channels in the hard link enables more data to be transmitted by enabling parallel transmittal, but hard links are often limited in physical size, thereby restricting the number of channels.

The concept of virtualization has been introduced to solve some of the sizing constraints associated with hard links. A so-called "virtual" channel operates by decoupling resources (e.g., a buffer) that were previously allocated to the actual channel. This decoupling is performed by effectively providing multiple different buffers for each single channel. FIG. 1B is illustrative.

FIG. 1B shows a connection terminal 125, which is representative of the connection terminal 100, and a channel 130, which is representative of the channel 105. Here, channel 130 has had its buffer resources virtualized to effectively sub-divide the channel into multiple channels or lanes. For instance, channel 130 is shown as including a virtual lane 135 and a virtual lane 140. Additionally, a set of packets are being transmitted across lane 135 (e.g., see packet 145) and a different set of packets are being transmitted across lane 140 (e.g., see packet 150). Now, the channel 130 is able to support a larger number of packets than channel 105, and the packets travelling along that channel may not be impeded by an idling packet in a different lane. In this regard, the "road" of channel 130 has been modified to include additional lanes, similar to a multi-lane highway. Further, if packet 145 were blocked, a different buffer is available to enable packet 150 to be transmitted. Accordingly, implementing virtual channels in a hard link is similar to the idea of adding new lanes to a road system.

When it comes to hard links, the resource that is considered to be the most costly is typically the bandwidth of the hard physical wire/channel. Buffer memory is often viewed as being the second most costly resource. Virtualization of the hard link achieves significant efficiency gains because those resources are used in a more efficient manner via the decoupling mentioned earlier. While virtualization does add a small expense, its expense is overshadowed by the other efficiency gains.

While high-speed connection terminals and protocols (e.g., PCIe) provide substantial benefits, these types of terminals can require high levels of power to operate. When these types of terminals are used in battery-powered computing architectures, the higher power drains can impose substantial burdens on the system.

Additionally, as is usually the case with many computing components, errors can occur when data packets are being transmitted. For instance, transient errors may occur from any number of factors, including environmental factors (e.g., temperature, electrostatic buildup, humidity, etc.), rough handling of the system, and so forth. Traditional buses handle these errors in an unsophisticated manner by simply re-transmitting the data when an error is detected. Some systems, however, have a real-time need (or a need that approximates real-time) for the data, so re-transmittal may not be a viable solution. Accordingly, although traditional systems provide many benefits, these systems are still quite inadequate when design considerations require low power and real-time usage of transmitted data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods configured to improve transmissions between a transmitter node and a receiver node via a high-speed high-bandwidth link by recovering from an error condition without requiring a re-transmittal of data.

In some embodiments, a data stream is initiated, where this data stream is designed to include packets of different data types, including a control data type and a non-control data type. A control data type packet is generated. Here, error correcting code (ECC) is selectively imposed on the control data type packet. This ECC is configured to enable errors occurring in the control data type packet to be corrected at the receiver node. Consequently, re-transmittal of the control data type packet is prevented. The transmitter node then transmits the control data type packet to the receiver node. Upon receipt of the control data type packet at the receiver node, error correction on the control data type packet using the ECC is performed when an error is detected or, alternatively, error correction is refrained from being performed when no error is detected. Additionally, non-control data type packets are generated. Here, the embodiments selectively refrain from imposing the ECC on the non-control data type packets. The process of selectively refraining from imposing the ECC on the non-control data type packets operates to reduce bandwidth usage over the hard link as compared to imposing ECC on the non-control data type packets. The transmitter node then begins transmitting the non-control data type packets to the receiver node. Upon receipt of the non-control data type packets at the receiver node and in response to an error in a non-control data type packet being detected, the embodiments allow corruption of data in the non-control data type packet to persist because this corruption is negligible.

Some embodiments are configured to improve power usage of a device (e.g., a battery operated device) by identifying when packet transmissions across virtual channels are complete and by causing nodes to enter a low power state/mode when those packet transmissions are complete.

Here, a transmitter node and a receiver node are connected via a hard link. Additionally, multiple virtual channels are initialized on the hard link, where each virtual channel is associated with a corresponding power-consuming node. Data streams are generated, where these streams are configured to include packets of different types, including a data type packet and an end condition type packet. The embodiments generate the packets and cause the transmitter node to transmit the packets to the receiver node over the virtual channels. Each virtual channel transmits one or more of the packets in different data streams. For each respective virtual channel, a number of operations are performed. One operation includes identifying when a final data type packet has been transmitted across each respective virtual channel. Another operation includes causing the transmitter node to transmit (for that respective virtual channel) one or more end condition type packets. Another operation includes causing a corresponding power-consuming node that corresponds to the respective virtual channel to transition from an active state to a low power state/mode. After final data type packets have been transmitted across all of the virtual channels, the transmitter node also sends a final end condition type packet to the receiver node. This final end condition type packet informs the receiver node that the data stream is complete.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 1A and 1B provide an introduction to virtualizing hard links.

FIGS. 7A, 7B, and 7C illustrate additional features regarding the MEMS mirror system.

DETAILED DESCRIPTION

Figure 2:
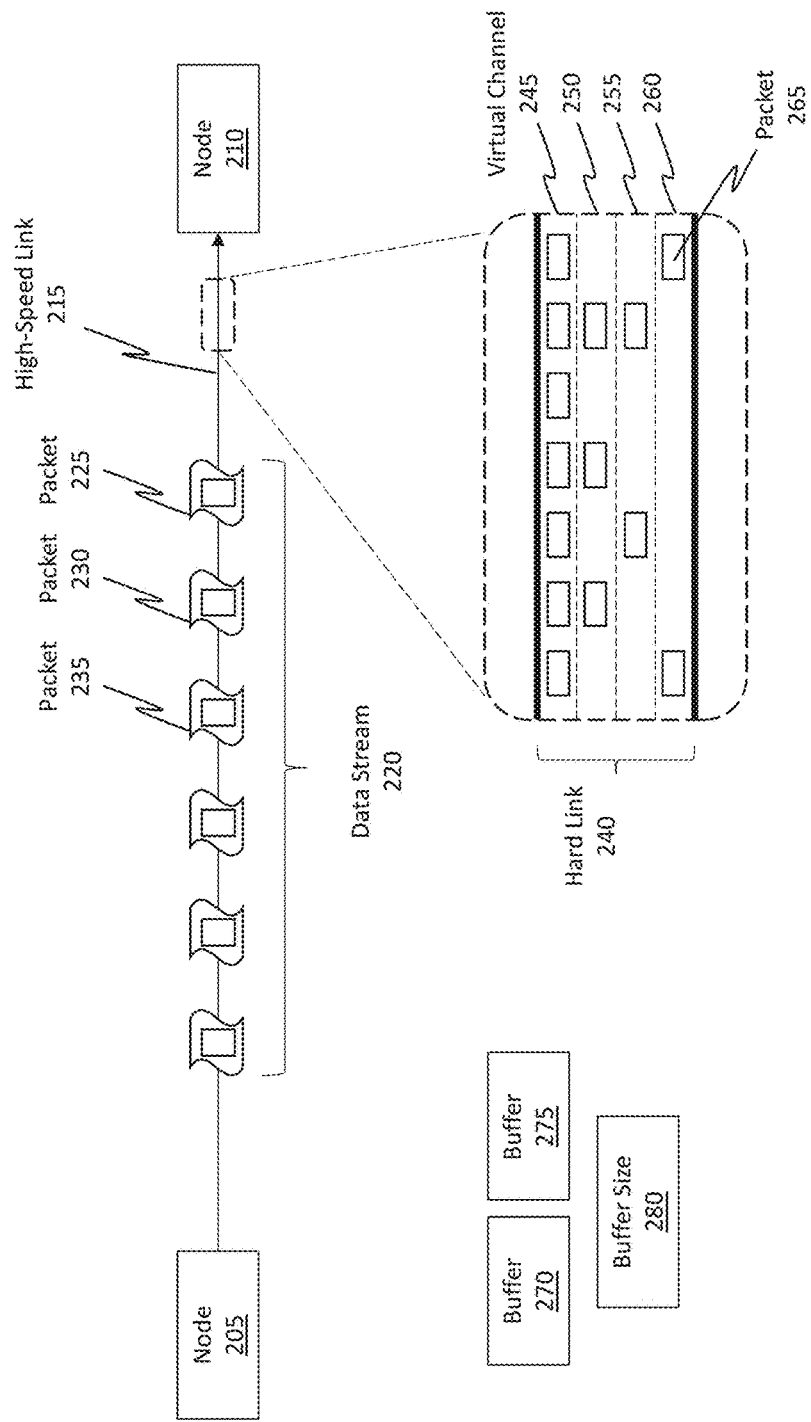
FIG. 2 illustrates how data packets are able to travel over virtual channels from one node to another node.

Embodiments disclosed herein relate to systems, devices (e.g., hardware storage devices, wearable devices, etc.), and methods configured to improve transmissions between a transmitter node and a receiver node via a high-speed high-bandwidth link (e.g., the link has 4×-8× the bandwidth requirements of standard PCIe) by recovering from an error condition without requiring a re-transmittal of data.

In some embodiments, a data stream is initiated. This stream includes a control data type packet and a non-control data type packet. Error correcting code (ECC) is selectively imposed on the control data type packet. This ECC enables errors occurring in the control data type packet to be corrected at the receiver node. When the receiver node receives the control data type packet, error correction is performed if needed. The embodiments also selectively refrain from imposing ECC on the non-control data type packets. When the receiver node receives the non-control data packets and in response to an error in the non-control data type packets being detected, the embodiments allow the corruption of this data to persist because it has an acceptable level of impact.

Some embodiments are configured to improve power usage of a battery-operated device by identifying when packet transmissions across virtual channels are complete and by causing nodes to enter a low power state when those packet transmissions are complete.

In some embodiments, a transmitter node and a receiver node are connected via a hard link that has multiple virtual channels initialized thereon. Each virtual channel is associated with a corresponding power-consuming node. Data streams are generated, where these streams include data type packets and end condition type packets. The transmitter node transmits the packets to the receiver node over the virtual channels. Each virtual channel transmits one or more of the packets. For each respective virtual channel, a number of operations are performed. One operation includes identifying when a final data type packet has been transmitted across each respective virtual channel. Another operation includes causing the transmitter node to transmit (for that respective virtual channel) an end condition type packet. Another operation includes causing a corresponding power-consuming node that corresponds to the respective virtual channel to transition from an active state to a low power state. After final data type packets have been transmitted across all of the virtual channels, the transmitter node sends a final end condition type packet to the receiver node. This final end condition type packet informs the receiver node that all of the data streams across all of the virtual channels are complete.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments improve the existing technology in numerous ways. For instance, by practicing the principles disclosed herein, the embodiments are able to reduce the amount of bandwidth consumed by packets transmitted over virtual channels when errors are detected for those packets. That is, whereas previous systems simply re-transmitted faulty or error-ridden packets (thereby consuming additional bandwidth over the virtual channel), the embodiments are able to selectively apply error correcting code (ECC) to certain types of high priority "control" data type packets. These types of packets are packets that include control information regarding how a set of subsequent packets (i.e. non-control data type packets) are to be utilized.

The control data type packets are differentially compressed and operate to control how the data in the non-control data type packets is used. Whereas an error on a single non-control data type packet results in an acceptable level of corruption, an error to the control data type packets may potentially result in corruption for the entire remaining data stream. As such, the embodiments beneficially apply ECC to the control data type packets. Because each data stream typically includes only a single control data type packet, imposing the ECC results in a nominal increase to the virtual channel's bandwidth. Despite this nominal increase, the benefits that are achieved by the ECC are substantial because the ECC allows for the receiving node to correct and/or detect the errors without requiring re-transmittal of the control data type packet (i.e. the system is resilient to errors without a re-transmit). As such, the embodiments improve the operational efficiency of the computer system by eliminating or at least reducing the likelihood of requiring packet re-transmittal. Additionally, ECC is not traditionally used for bus protocols; instead, ECC is typically used for memory-based operations. In this regard, the embodiments are also utilizing ECC in a new manner.

The disclosed embodiments also improve the technical field by minimizing or reducing the amount of battery consumption that is consumed. Specifically, the embodiments configure and utilize a so-called "end condition packet" or "end condition type packet" that is specially configured to impose nominal usage of the virtual channel's bandwidth while also acting as a flag to trigger a power-consuming node to transition to a low power state/mode. Because each virtual channel may be associated with its own corresponding power-consuming node, the end condition packets, which may be sent across the different virtual channels at different times, enables the system to reduce power usage by allowing nodes to turn off at earlier times as compared to conventional systems. In this regard, the embodiments improve the battery usage of the computer system by enabling power-consuming nodes to transition to low power states/modes earlier than what was previously available in conventional systems. In actual implementations, the embodiments have achieved upwards of 8× the power savings of conventional systems.

In embodiments dealing with a scanning MEMS mirror, the system is also able to beneficially supply all the lasers with a minimum virtual channel buffer at roughly the same time. So the length of the data that is sent per virtual stream is relatively low (single % of the line of pixels or sweep). The hardware is able to keep each virtual channel supplied with data so the data can be given to the lasers with a very low latency while not consuming a large amount of the buffer's bandwidth. Some of these features may also be implemented by hardware such that the software stack is essentially non-existent.

Additionally, the embodiments are able to beneficially capitalize on virtualization. For instance, suppose an error occurs on one of the virtual channels. The embodiments are able to allow the other virtual channels to complete their transmissions and processes despite the one virtual channel experiencing an error. By way of a specific example, suppose a red laser corresponds to one virtual channel. Further suppose an error occurs relative to this virtual channel. The other lasers and the other virtual channels are able to complete their respective operations despite the error occurring on the one virtual channel. By transmitting the end condition packet, the system is also able to reset itself (e.g., the laser and virtual channel that experienced the error) despite the error so that the laser and virtual channel can still be used.

Interconnection Networks

Attention will now be directed to FIG. 2, which illustrates an example of an interconnection network 200. The interconnection network 200 may comprise any number of interconnected nodes, such as node 205 and node 210. Examples of nodes 205 and 210 may be any type of computing component, including high-speed computing components. For instance, the nodes 205 and 210 can be any type of CPU, GPU, HPU (holographic processing unit), DMA (display module assembly) chip, a MEMS system, memory, and so forth, without limit. As shown, node 205 is connected or tethered to node 210 via a high-speed link 215. High-speed link 215 may be any type of physical channel connection that supports high-speed data transmissions.

Communication between node 205 and node 210 occurs by transmitting messages from a transmitter node (e.g., node 205) to a receiver node (e.g., node 210) (though the messages can potentially be transmitted back and forth). A message may be divided or broken down into one or more different "packets" that are transmitted in the form of a data stream 220. As used herein, a "packet" is the smallest body or unit of data/information that contains routing, sequencing, and payload information. That is, the message may be subdivided into any number of constituent parts, and those parts may be transmitted in the form of a packet, such as packets 225, 230, and 235. In the example of FIG. 2, the node 205 is a transmitter node because node 205 is sending the data stream 220 to the node 210, which is a receiver node. When the node 210 receives the packets, the node 210 will organize the packets to reform the original message.

Embodiments disclosed herein may virtualize the high-speed link 215 to include any number of virtual channels. For instance, the hard link 240 is representative of the high-speed link 215. This hard link 240 is shown as including any number of virtual channels, such as virtual channels 245, 250, 255, and 260. Packets (e.g., packet 265) are shows as being transmitted across those different virtual channels.

Each virtual channel is associated with its own respective buffer. For instance, virtual channel 245 may be associated with buffer 270, and virtual channel 250 may be associated with buffer 275. The other virtual channels are associated with their own respective buffers, even though that is not currently shown in FIG. 2. Each buffer may have a corresponding buffer size 280. In accordance with the disclosed principles, hardware is able to keep the channel's bandwidth balanced between various requesters (i.e. receiving nodes). In some cases, the buffer sizes for all of the different buffers may be the same while in other cases the buffer sizes may be different. Some buffer sizes may be the same for some buffers while other buffer sizes may be different. In any event, the buffer size 280 is based on the total buffer size available for the hard link 240. In some cases, the length of data included in any particular packet of the data stream is restricted based on buffer sizes of virtual channels initialized for the hard link. Accordingly, FIG. 2 shows how packets may be transmitted from one node to another node via a high-speed link.

Example Head-Mounted Device (HMD)

Figure 3:
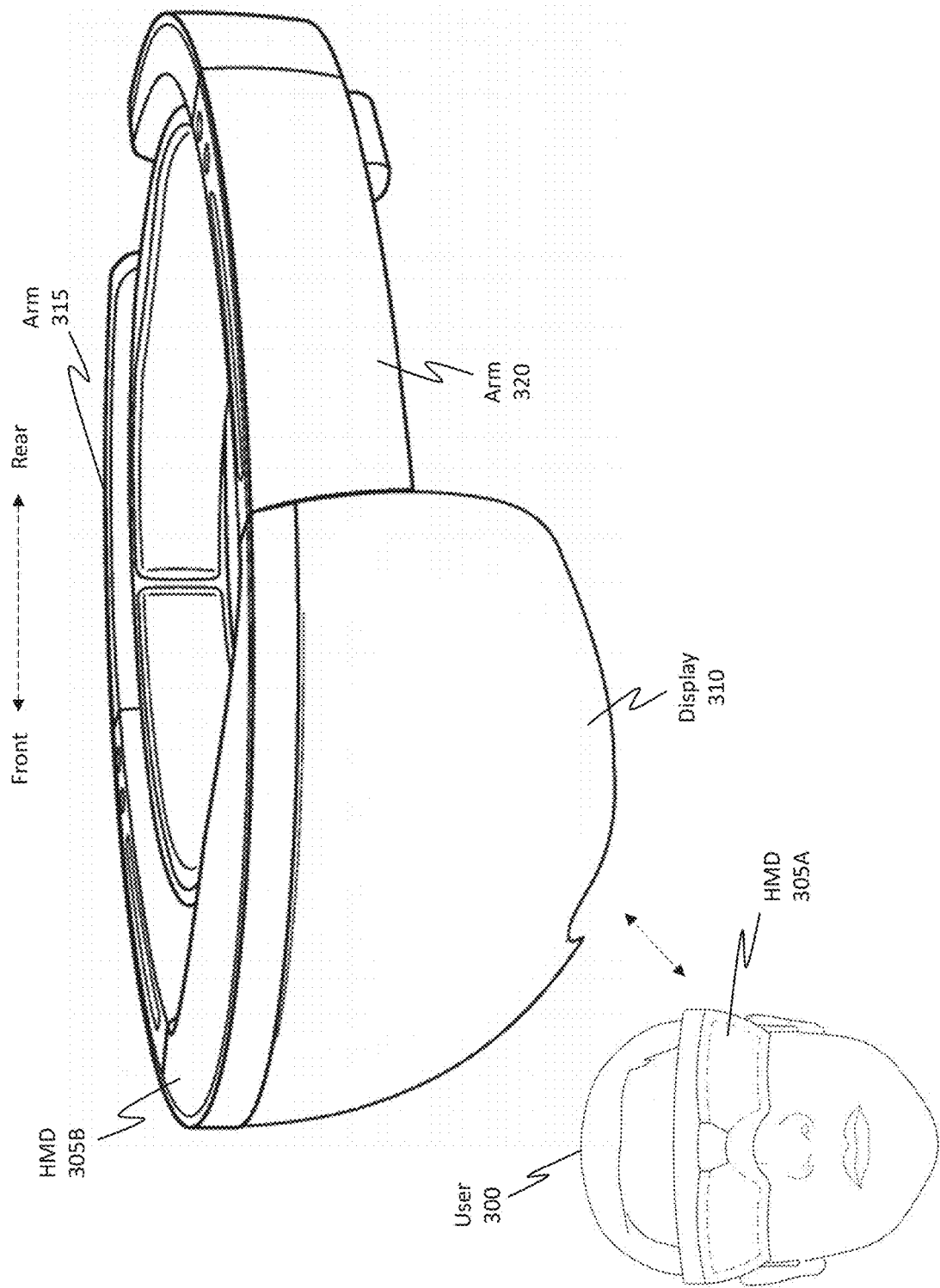
FIG. 3 illustrates an example head-mounted device (HMD) that may require low power usage for hard links and real-time data usage requirements.
Figure 4:
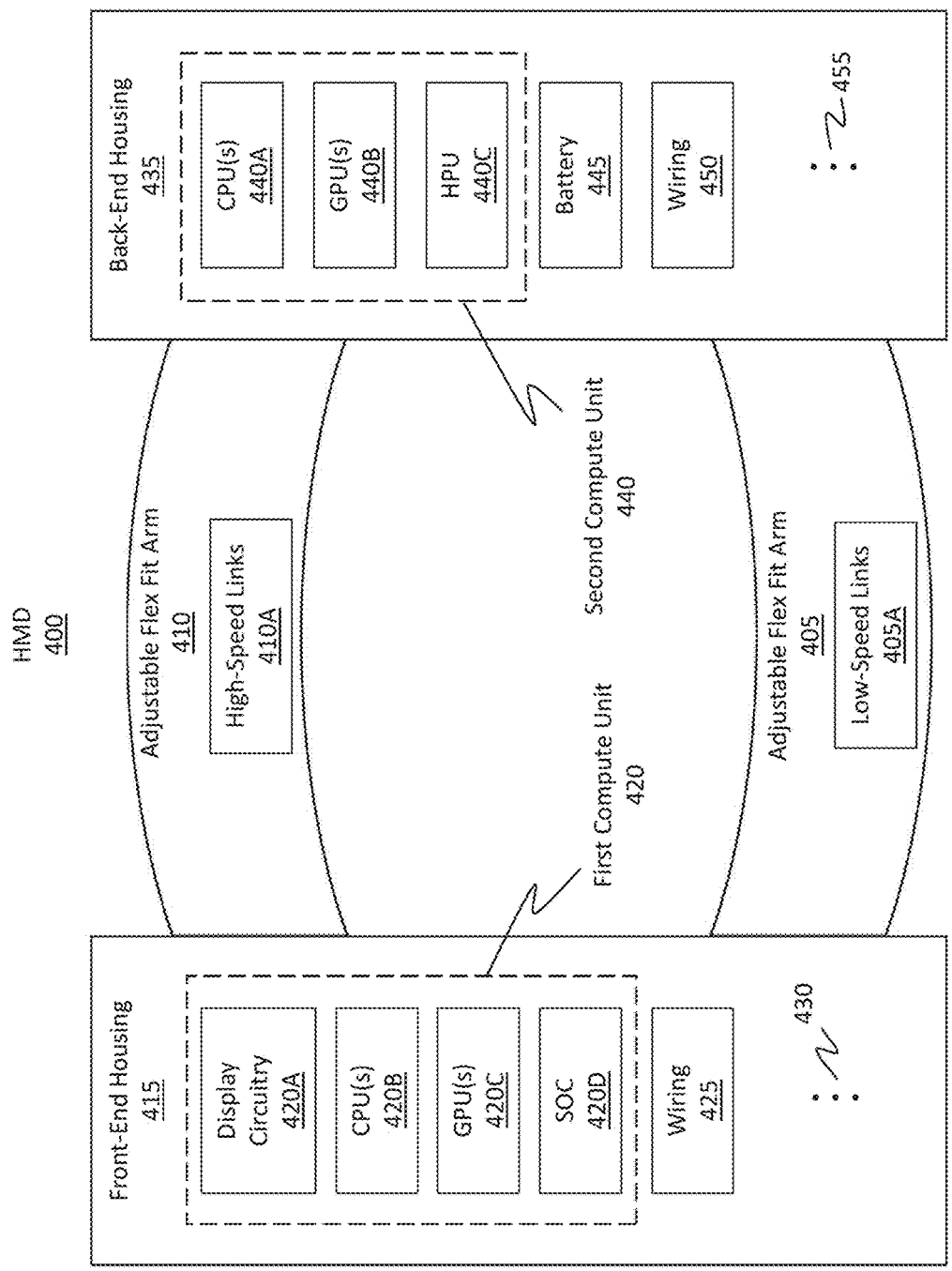
FIG. 4 illustrates some internal features, including a high-speed link, of the HMD.
Figure 5:
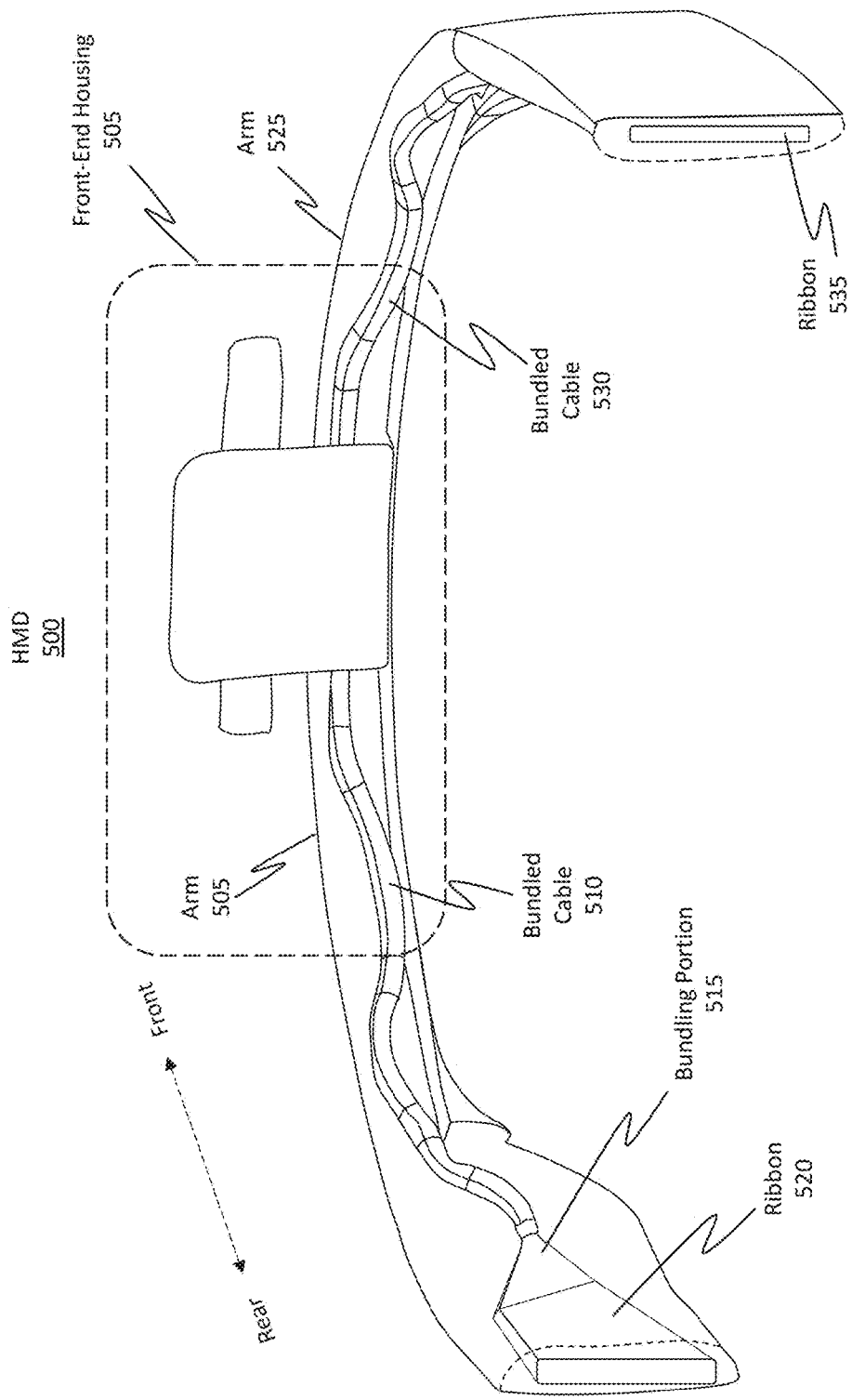
FIG. 5 illustrates an abstracted viewpoint of some of the computing components of the HMD.

Attention will now be directed to FIGS. 3, 4, and 5. These figures provide example illustrations of a head-mounted device (HMD), which is a computing architecture that may include any number of interconnected nodes or the interconnection network 200 of FIG. 2. Notably, while a substantial portion of this disclosure is focused on the use of nodes in an HMD, one will appreciate that the disclosed principles are not limited to only these scenarios. Rather, nodes can be included in any type of computing architecture, without restriction, and the embodiments may be practiced with those different computing architectures. Accordingly, the discussion surrounding the HMD is for example purposes only and should not be interpreted as being limiting.

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

FIG. 3 shows a user 300 wearing an HMD 305A, which is an example of the MR system mentioned above. The user 300 can wear the HMD 305A to view and interact with an MR scene. HMD 305B, which is a blown-up view of the HMD 305A, includes a display 310, a first arm 315, and a second arm 320. As shown, the display 310 is oriented towards the front of the HMD 305B so as to be positioned near the user's eyes.

It will be appreciated that display 310 can include any type of display. In some embodiments, display 310 includes a microelectromechanical scanning (MEMS) mirror display in which image pixels are individually rastered by a laser and mirror assembly. In other embodiments, display 310 includes any type of light-emitting diodes, plasma displays, liquid crystal displays, and so on. Accordingly, any type of display may be included within HMD 305B, and the embodiments should not be limited to a particular type.

FIG. 4 shows an HMD 400, which is an abstracted representation of the HMD 305B from FIG. 3, using some abstracted block depictions to represent HMD components. It will be appreciated that these blocks are for example purposes only and should not be viewed literally as having block-like shapes.

HMD 400 includes a first adjustable flex-fit arm 405 (i.e. the same as in FIG. 3) and a second adjustable flex-fit arm 410. The first adjustable flex fit arm 405 is shown as including any number of low-speed links 405A (aka wires or channels) while the second adjustable flex fit arm 410 is shown as including any number of high-speed links 410A. Of course, the high-speed and low-speed wires can be positioned on either side of the HMD and are not limited to a specific side. Further detail on these wires will be provided later. Furthermore, it should be noted that these wires may be configured as ribbons and/or bundled cables.

The high-speed links 410A can be used to transmit high-speed display data and/or sensor data (e.g., camera data, such as head tracking and depth detection) between the compute units located in the front-end housing and the compute units located in the back-end housing. These high-speed links 410A are designed to have low latency, thereby enabling a high number of compute cycles or communications to be passed therethrough.

In contrast, the low-speed links 405A can be used to provide power, ground (e.g., connections to a battery), or switching mechanisms. That is, in some cases, the low-speed links 405A also include switches or signals that can operate at lower speeds as compared to the compute cycles of the high-speed links 410A.

HMD 400 also includes a front-end housing 415, which includes a first compute unit 420 and wiring 425. The ellipsis 430 is provided to illustrate how the front-end housing 415 may include additional components or structures as well.

The first compute unit 420 is shown as including a number of different compute elements. Specifically, these compute elements include, but are not limited to, display circuitry 420A (e.g., such as display 310 from FIG. 3, including a digital display processing (DPP) chip, an analog chip that drives a display module assembly (DMA), the DMA itself, lasers, and a MEMS mirror system), one or more CPU(s) 420B (i.e. central processing units), one or more GPU(s) 420C (i.e. graphical processing units), and a SOC 420D (i.e. a system on chip). These compute elements/units are provided to render any number of virtual images for a user to view and interact with.

HMD 400 also includes a back-end housing 435, which includes a second compute unit 440, a battery 445, and wiring 450. The ellipsis 455 demonstrates how any number of other compute elements, structures, or features may be included with the back-end housing 435. The first adjustable flex fit arm 405 connects the front-end housing 415 to the back-end housing 435, and the second adjustable flex fit arm 410 similarly connects the front-end housing 415 to the back-end housing 435.

The second compute unit 440 is shown as including one or more CPU(s) 440A, one or more GPU(s) 440B, and a holographic processing unit HPU 440C. As used herein, an HPU (e.g., HPU 440C) refers to a compute processing unit that obtains and integrates real-world data into an MR scene. In some cases, HPU 440C controls any number of inertial measurement units (IMU), head and hand tracking cameras, and depth cameras to generate a spatial mapping of the real-world environment. Using this spatial mapping, HMD 400 (and in particular HPU 440C) can cause holograms or virtual images to be projected for the user to view and interact with.

It will be appreciated that although SOC 420D is shown as being included in the front-end housing 415 and the HPU 440C is shown as being included in the back-end housing 435, the positions can be reversed. In other cases, both of the compute units can be included in the front-end housing 415 or both can be included in the back-end housing 435. Accordingly, FIG. 4 is provided to simply show one example implementation regarding the placement and configuration of some of the compute units of an HMD. Additionally, the battery 445 can also be positioned in the front-end housing 415 if so desired.

FIG. 5 provides another perspective of an HMD 500, which is representative of the HMDs discussed thus far. HMD 500 includes a front-end housing 505, just like front-end housing 415 of FIG. 4. HMD 500 also includes arm 505, with a bundled cable 510 passing therethrough. At a different segment of arm 505, the electrical wires are bundled together at the bundling portion 515 where they are structured as a nested cable ribbon 520.

HMD 500 includes another arm 525, with a bundled cable 530 passing therethrough. Similarly, arm 525 also includes a nested cable ribbon 535. Accordingly, the HMD 500 includes two arms (e.g., arm 505 and arm 525), with each arm having a corresponding set of electrical wires passing through the internal confines, or rather the internal cavities, of those arms.

The high-speed link 215 from FIG. 2 may be representative of the high-speed links 410A from FIG. 4. Similarly, the ribbon 520 and the bundled cable 510 from FIG. 5 may be representative of the high-speed link 215. The nodes 205 and 210 from FIG. 2 may be representative of any of the compute units illustrated in FIG. 4, such as the display circuitry 420A, the CPU(s) 420B and 440A, the GPU(s) 420C and 4406, the SOC 420D, and the HPU 440C. In some embodiments, the nodes may be individual compute units located within either one of the front-end housing 415 of FIG. 4 or the back-end housing 435. For instance, the display circuitry 420A may include any number of lasers, digital display processing (DPP) chips, DMAs, DMA-driving chips, or MEMS mirror systems. These compute units may also be representative of the nodes introduced in FIG. 2.

Additionally, these compute units may have shortened high-speed links connecting those elements. To clarify, whereas the high-speed links 410A shown in FIG. 4 illustrate how the front-end housing 415 can be connected to the back-end housing 435, it may be the case that there are additional high-speed links connecting individual nodes located within the front-end housing 415 exclusively or within the back-end housing 435 exclusively. In that case, those links will be relatively shorter than the high-speed links 410A. In any event, the HMDs discussed herein may use any number of high-speed links to connect different high-speed compute units, such as those described above.

Laser-Based MEMS Display System

Figure 6:
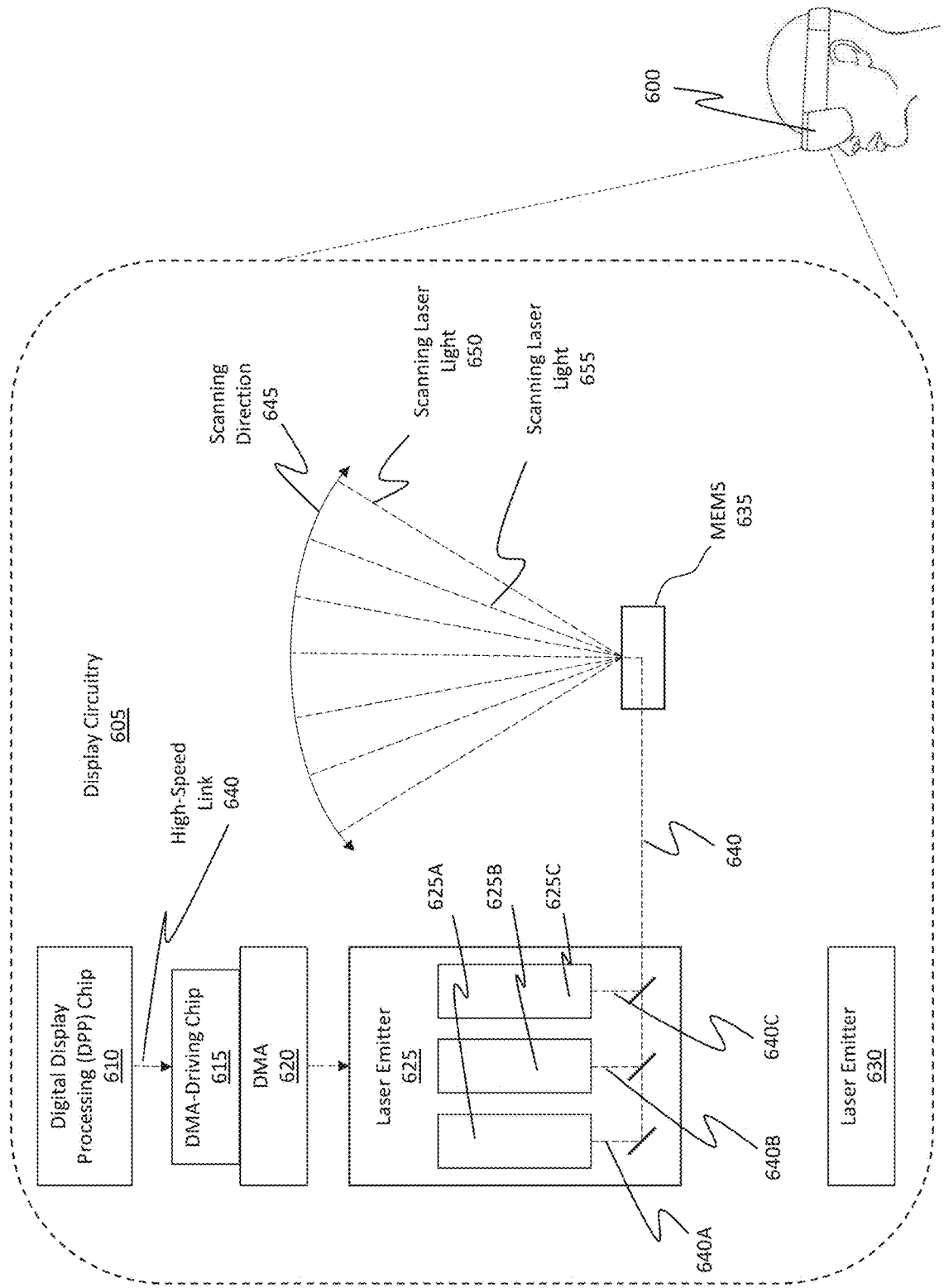
FIG. 6 illustrates how an HMD can use a laser-based microelectromechanical scanning (MEMS) mirror system to display content.

FIG. 6 shows some components that may be included within a display for a MR computing system, which includes HMD 600. HMD 600 is representative of the HMDs discussed thus far. The illustrated components are beneficially provided to render any type of virtual image. Specifically, FIG. 6 focuses on the display circuitry 605 used to render images, which circuitry is representative of the display circuitry 420A of FIG. 4. The display circuitry 605 includes, but is not limited to, a digital display processing (DPP) chip

610, an analog display module assembly (DMA) driving chip 615, the DMA 620, laser emitters 625 and 630 (though more or less may be provided), and a MEMS system 635. A DMA is often architected for up to four different lasers, so it may be the case that there are multiple DMAs in the HMD 600.

In practice, the DPP chip 610 transmits image data (in the form of packets) to the DMA-driving chip 615 over a high-speed high-bandwidth hard link at a rate so that the line of data being transmitted is typically one "sweep" ahead of where certain lasers are actually projecting data. Consequently, the buffers of the virtual lanes are being used to pre-send pixel information for pixels that are to be illuminated at some point in the future. Further details on "sweeps" will be provided later.

In this regard, the laser emitters 625 and 630 function as projectors for the HMD 600. The virtual channels are able to buffer the one-sweep-ahead display data in the packets. The DPP chip 610, the DMA-driving chip 615, the laser emitter 625, and even the MEMS system 635 may all be considered "nodes," as referred to in the earlier figures. Furthermore, there is a high-speed link 640 between at least the DPP chip 610 and the DMA-driving chip 615. Other high-speed links may be present between any of the other nodes as well. The DPP chip 610 operates to provide information regarding how images are to be projected via the MEMS system 635.

Laser emitter 625 (aka "laser assembly," "laser device," or simply "laser") includes one or more lasers. The example shown in FIG. 6 illustrates a (first) laser 625A, a (second) laser 625B, and a (third) laser 625C, though more or less may be provided. Examples of these lasers may be a red laser, a green laser, and a blue laser such that the laser emitter 625 is a red, green, blue (RGB) laser assembly having RGB lasers. While only three lasers are presently shown, it will be appreciated that any number of lasers may be provided in HMD 600 (e.g., perhaps 1-4 red lasers, 1-4 green lasers, and 1-4 blue lasers). Moreover, in some embodiments, lasers 625A, 625B, and 625C may be included within their own different discrete packaging unit. In some embodiments, an infrared (IR) laser may be included as a part of laser emitter 625 or within a separate packaging unit.

In some embodiments, such as the one shown in FIG. 6, the laser light from the lasers 625A, 625B, and 625C is optically/spectrally combined to form RGB laser light 640. That is, the laser light 640A from laser 625A, the laser light 640B from laser 625B, and the laser light 640C from laser 625C is optically/spectrally combined (e.g., either within the laser emitter 625 or outside of the laser emitter 625) to produce a single collimated beam of red, green, and blue RGB laser light 640. It will be appreciated that RGB laser light 640 may be a continuous beam of RGB laser light, or, alternatively, it may be a pulsed beam of RGB laser light.

RGB laser light 640 is then directed to a microelectromechanical scanning ("MEMS") mirror system 635. MEMS mirror system 635 includes a multi-directional mirror array that is able to rapidly redirect and aim laser light to any desired pixel location. For example, scanning direction 645 shows how MEMS mirror system 635 is able to rapidly redirect pulsed or continuous scanning laser light 650 and scanning laser light 655 to any location. Here, scanning laser light 650 and 655 originate from RGB laser light 640.

While only two instances of the scanning laser light are labeled, it will be appreciated that MEMS mirror system 635 is able to redirect any number of laser emissions. By scanning laser light back and forth horizontally and up and down vertically, the display circuitry 605 is able to illuminate individual pixels of a virtual image within a desired field of view. Because the display circuitry 605 is able to illuminate individual pixels so rapidly, display circuitry 605 is able to render an entire virtual image (e.g., an image frame) for a user to view and interact with without the user realizing that the virtual image was progressively generated by scanning individual pixels.

In some embodiments, the display circuitry 605 includes more than one laser emitter. For instance, FIG. 6 shows a (second) laser emitter 630. In cases where there are more than one laser emitter, then the emitters can be configured to jointly or concurrently illuminate pixels to generate an image frame. In some cases, the different laser emitters may be associated with different DMAs as well. In some embodiments, an image frame is illuminated by one, two, or more than two separate laser emitters. In some implementations, there may be 12 different lasers, or even more than 12 lasers. In some cases, the multiple separate laser emitters concurrently illuminate corresponding pixels. In other cases, the multiple separate laser emitters stagger when pixels are illuminated.

Figure 7C:
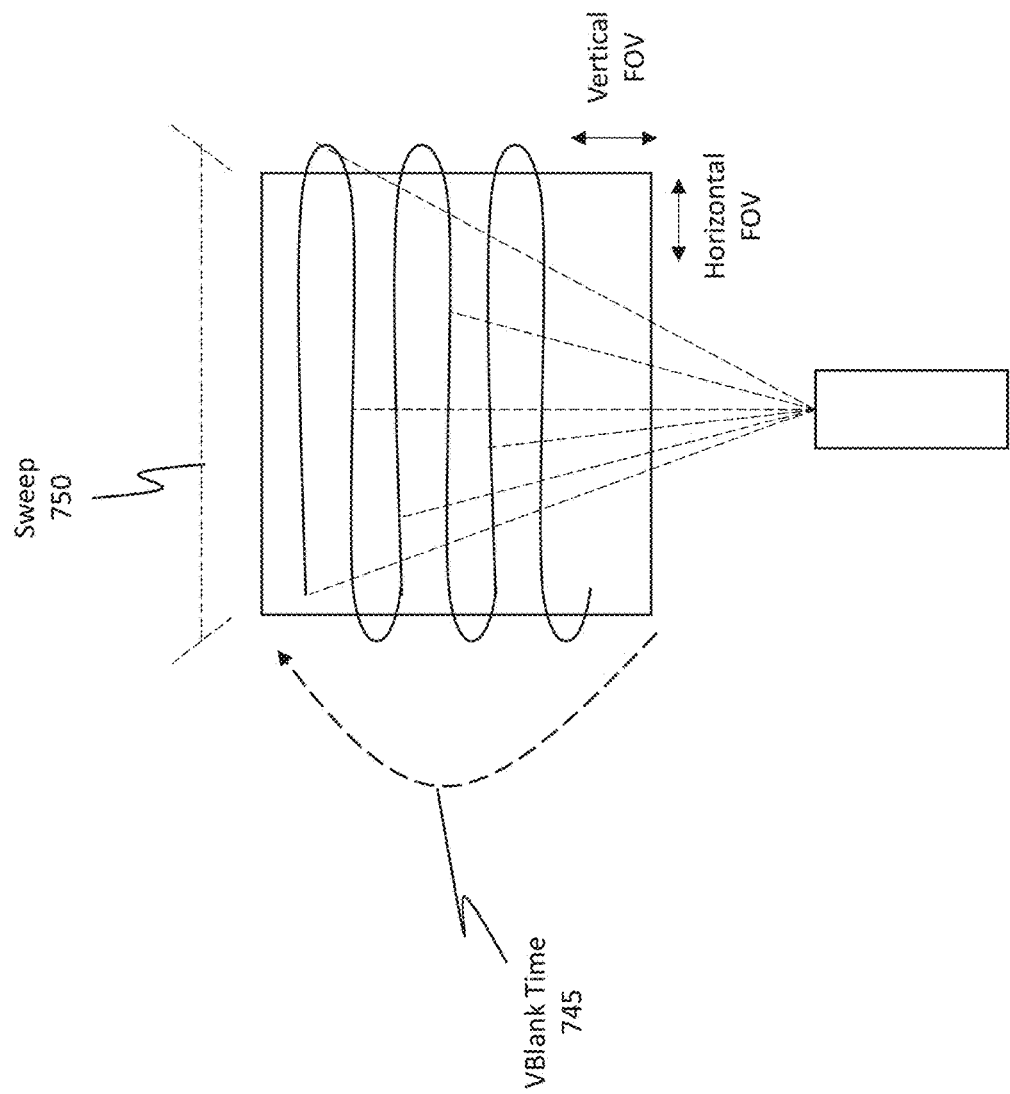

FIGS. 7A, 7B, and 7C further expand on the operations of a MEMS mirror system by showing how a MEMS/laser unit 700A can be used in a VR type of HMD and how a MEMS/laser unit 700B can be used in an AR type of HMD, respectively. MEMS/laser units 700A and 700B are both example implementations of the MEMS mirror system 635 shown in FIG. 6. Pulsed or continuous laser light 650 and laser light 655 in FIG. 6 are example implementations of laser light 705A and 705B.

In FIG. 7A, the display 710 is representative of a VR display of a VR type HMD. As described earlier, in a VR situation, the user's view of the real-world is entirely occluded such that the user is able to see only a VR environment. Here, display 710 is shown as including a vertical field of view ("FOV") and a horizontal FOV. FIG. 7A also shows the progressively backward and forward horizontal and upward and downward vertical scanning direction 715 in which the MEMS/laser unit 700A is able to scan individual pixels of a virtual image onto the display 710. By rapidly scanning/rastering the individual pixels, the MEMS/laser unit 700A is able to render an entire virtual image or even an entire VR environment.

Building on the earlier discussion, it will be appreciated that each pixel rastered on the display 710 is generated by pulsing the laser included within the MEMS/laser unit 700A. In this manner, it is possible to illuminate each pixel on display 710 in a pixel-by-pixel basis all the way from the top portion of the display 710 to the bottom portion of the display 710. Consequently, as the MEMS mirror system in the MEMS/laser unit 700A is scanned/aimed at a given pixel position on the display 710, the laser is pulsed to a determined intensity or power output level so as to properly illuminate that pixel within the overall virtual image. The frame is over when the last pixel is illuminated, and the MEMS/laser unit 700A enters a so-called "vblank" time period in which the MEMS/laser unit 700A resets its mirrors to an original starting position so as to generate a new frame. The period of time to scan each new frame and to reset during the vblank period is referred to as the refresh rate 720. Examples rates for the refresh rate 720 can be between 90 Hz and 120 Hz, though other rates may be used as well.

FIG. 7B shows an example implementation within an AR system. Instead of scanning pixels on a display (e.g., display 710), the AR system causes its MEMS/laser unit 700B to scan pixels onto the user's eye through the use of a waveguide 725, which receives the laser light and then directs the laser light towards the user's eye. In this regard, FIG. 7B is representative of a scanning waveguide display.

To illustrate, FIG. 7B shows MEMS/laser unit 700B generating pulsed laser light 705B which is directed towards waveguide 725. Waveguide 725 includes an entry grating 730 (aka an "input port" or "input grating"), through which pulsed laser light 705B enters waveguide 725, and an exit grating 735, through which pulsed laser light 705B exits waveguide 725. Waveguide 725 is structured to enable the pulsed laser light 705B to propagate through it so that the pulsed laser light 705B can be redirected to a desired location, such as the scanning area 740. In many instances, the scanning area 740 corresponds to a user's eye.

FIG. 7C illustrates the vblank time 745 and a sweep 750. As described earlier, the vblank time 745 is the period of time in which no pixels are being illuminated (thus no data stream is being transmitted between the DPP chip 610 and the DMA-driving chip 615); rather, the MEMS system is resetting its mirror to return to an original start position so as to begin generating a new frame. Often, the vblank time 745 consumes between 10%-30% of the frame's time period. In some cases, the vblank 745 is about 20% of the time allocated for the particular frame. The sweep 750 refers to a single horizontal pass of the MEMS mirror system when scanning an individual line of pixels of the frame. Stated differently, a sweep is half of a full period of the fast scan mirror of the MEMS mirror system. By way of example and not limitation, the sweep 750 can be considered or viewed as a line of pixels spanning from one side of the display (or scanning area) to the other side of the display (or scanning area).

Notably, it may be the case that not every pixel of a sweep will be illuminated by all the lasers (also it may be the case that each virtual channel corresponds to a respective laser). Consequently, it may be the case that there are different sweep sizes per virtual channel.

Accordingly, the disclosed principles may be practiced in any type of computing architecture. In some implementations, the principles are utilized in the context of an HMD and in particular for some of the different nodes of the HMD (e.g., the DPP chip 610 and the DMA-driving chip 615 of FIG. 6). Additional details regarding the various operations of the embodiments will now be discussed in more detail in the following sections.

Improved Techniques for Power Usage and Error Correction/Detection

Figure 8:
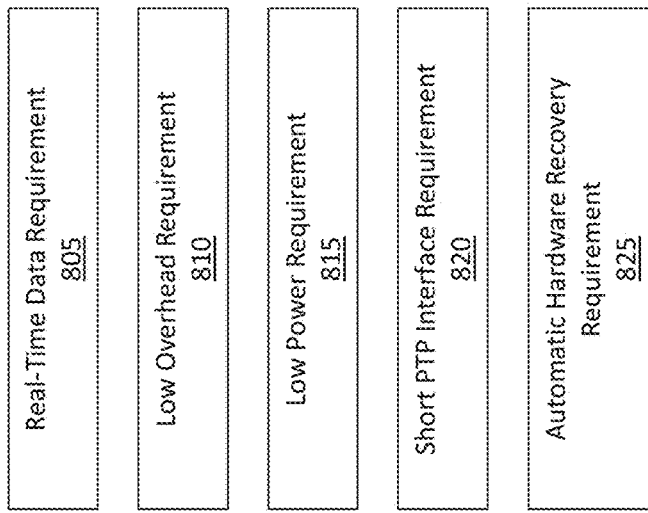
FIG. 8 illustrates some operational requirements that are considered by the disclosed embodiments.

Attention will now be directed to FIG. 8, which lists a number of operational requirements 800, or rather, operational features, that may be followed by one, some, or all of the disclosed embodiments. These requirements will be introduced at a high level at this point, and a further discussion regarding these requirements will be provided later throughout the remaining portion of this disclosure.

Initially, the operational requirements 800 include a real-time data requirement 805. As discussed earlier in connection with the HMDs, the HMDs are used to display content to a user. The HMD has the real-time requirement 805 because it needs to draw something on its screen (or otherwise illuminate pixels), and the data pipeline for instructing how to draw those pixels is already working on new pixels to draw (e.g., the one sweep ahead aspect mentioned earlier), so it is desirable to avoid re-transmitting data. To further clarify, each laser of the HMD may have its own real-time requirements for when pixel data is to be received by the chip(s) driving those lasers.

Furthermore, the content dynamically changes based on a number of different factors, some of which include pose/orientation of the HMD, scene changes of the MR scene, interactions with the holograms, and so forth. As such, when the embodiments are practiced in the context of an HMD, the data transmitted from one node to another node in the HMD may be required to satisfy the real-time data requirement 805. What this means is that the ability to re-transmit data, as conventional systems do when faced with errors in the data, is now not available for the HMD implementations. To clarify, re-transmittal to resolve or correct errors is not available because of the real-time data requirement 805. As such, the disclosed principles introduce a new and different technique for responding to errors, which technique will be discussed in more detail later.

The operational requirements 800 also include a low overhead requirement 810. As discussed earlier, there is limited bandwidth over the hard link between nodes. The disclosed principles provide techniques for error correction that not only conform to the real-time data requirement 805 but that also result in a low amount of additional overhead being placed on the bus protocol. As such, the disclosed embodiments provide substantial benefits by introducing negligible overhead in order to achieve substantial gains. This negligible overhead is achieved because only certain types of packets (not all) are given error protection, which causes the overhead.

The operational requirements 800 further include a low power requirement 815. Based on certain characteristics of the data stream, the embodiments are able to selectively deactivate power-consuming nodes in order to reduce power. For instance, in the context of an HMD, the embodiments are able to cause lasers to enter a low power state based on the detection of certain data packets that are transmitted between nodes.

Some embodiments also conform to a short point-to-point (PTP) interface requirement 820 in which the different nodes are positioned a short distance relative to one another. As used herein, a so-called "short" distance is one in which transmission loss of the hard link is negligible as a result of the physical length of the hard link. Example lengths include, but are not limited to, lengths between 0 inches and up to about 6 inches. Some embodiments also operate at so-called medium lengths, which are lengths beyond 6 inches and perhaps reaching up to 10 inches.

Additionally, the operational requirements 800 include an automatic hardware recovery requirement 825 (as opposed to reliance on a software recovery operation). This requirement or feature enables the hardware to automatically recover after an error is detected. Further discussion on each of these features will be provided later.

Packets Types

Figure 9:
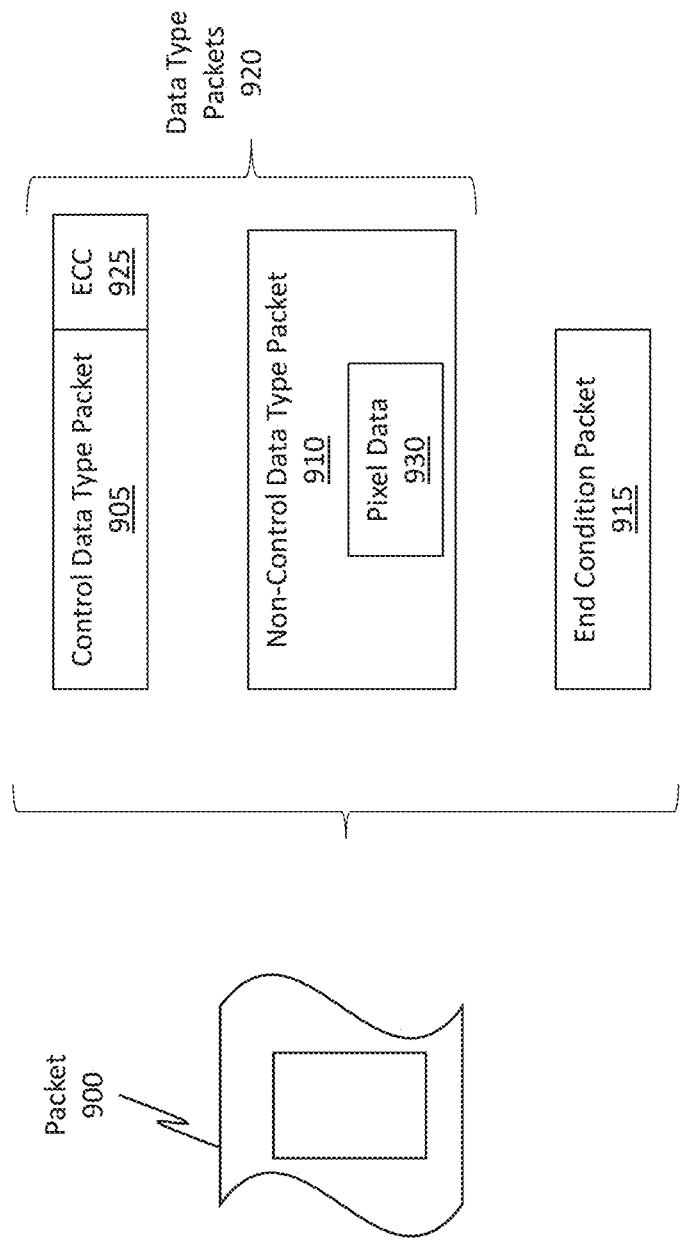
FIG. 9 illustrates the use of different types of packets for transmitting data to achieve the benefits disclosed herein.

To achieve the above requirements and benefits, some embodiments cause specific types of packets to be transmitted from one node to another node in the data stream. FIG. 9 illustrates an example packet 900, which is representative of the packets that were discussed in FIG. 2. Notably, packet 900 may take on different forms, including a control data type packet 905, a non-control data type packet 910, and an end condition packet 915.

The control data type packet 905 and the non-control data type packet 910 are examples of packets that contain data (i.e. data type packets 920) while the end condition packet 915 operates as a flag for triggering a certain action to occur (i.e. a flag informing the receiver node that the data stream is complete). That is, the end condition packet 915 gives the status of the virtual lane based on a condition in which the control data type packet 905 indicates there was an end for the data stream, thereby triggering a status bit to be set (per virtual channel) and thereby triggering the transmission of the end condition packet 915.

In some embodiments, after all of the virtual lanes have finished sending their respective data streams, the last virtual channel to finish sending its data stream sends an additional final end condition packet that gives the status of all of the virtual lanes. Further details on this feature will be discussed later. In any event, the transmitter node does not send any new traffic for a virtual channel (e.g., once one or more end condition packets have been transmitted via that virtual channel) until such time as when all the virtual channels have completed transmitting their respective data streams for the sweep. When a new sweep is initiated or a new frame is initiated, then the virtual channels will once again commence sending packets.

As used herein, the control data type packet 905 is a type of packet that includes control data for controlling how a particular operation is to be performed. For instance, with reference to the HMD example, the control data type packet 905 may include timing information as to when a laser is to emit laser light, payload type information, virtual channel/lane information, and may further include placement information as to where (e.g., which specific pixel) the laser is to pulse its laser light. The control data type packet 905 may also include header information indicating which channel or virtual channel is to be used. For instance, each laser of an HMD may be associated with its own respective virtual channel. The control data type packet 905 may include control information and virtual channel information for that virtual channel's corresponding laser.

In some cases, the content included in the control data type packet 905 is compressed (e.g., differentially compressed) and includes data for an entire sweep of the corresponding laser. To clarify, a sweep is an entire line of pixels. The control data type packet 905 may include timing and placement information not only for a single pixel but rather for all of the pixels that are to be illuminated by the one corresponding laser across the entire line or sweep of pixels. The control data type packet 905 is the first packet that is transmitted in a data stream across a virtual channel. A different data stream may be transmitted across each one of the different virtual channels, and the control data type packet 905 is the first packet that will be transmitted in that data stream (unless no pixels in a sweep are going to be illuminated by the corresponding laser, then only an end condition packet 915 will be transmitted).

Figure 10:
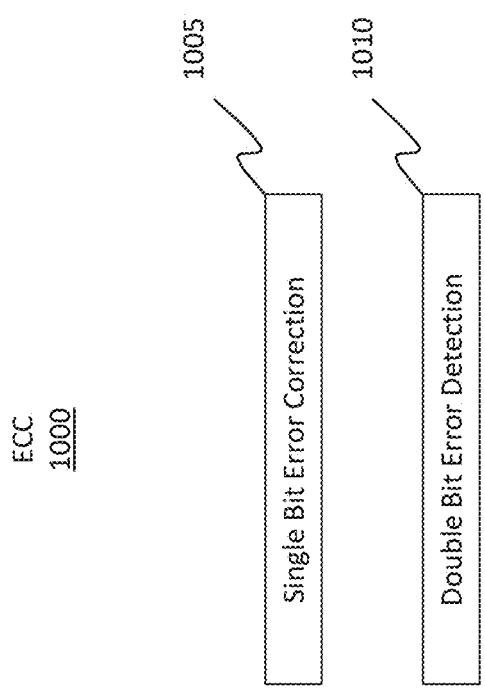
FIG. 10 illustrates how error correcting code (ECC) may be used to help prevent re-transmittal of data.

Because of the importance of the control data type packet 905, this packet is protected using error correcting code ECC 925. To clarify, because the timing and placement information included in the control data type packet 905 was differentially compressed and of high importance, ECC 925 is used to protect the data from errors that may occur during transmission. If an error were permitted to persist on the data included in the control data type packet 905, then the entire sweep may be corrupted, thereby resulting in artifacts (e.g., blurring, jitter, etc.) being introduced into the resulting image frame. FIG. 10 provides some additional description regarding ECC 1000, which is representative of the ECC 925 of FIG. 9.

Specifically, the ECC 1000 includes at least two types of protections, including single bit error correction 1005 and double bit error detection 1010. In some embodiments, the error protection is an x-bit error correction and an x+1-bit error detection. The ECC 1000 is selected to ensure that the ECC 1000 supports the error rate. The ECC 1000 may, in some instances, be 8 bits per control data type packet, or some other selected number of bits based on the length of the control data type packet. Selectively imposing the ECC 1000 on the control data type packet provides substantial benefits, which will be discussed momentarily.

Returning to FIG. 9, the non-control data type packet 910 is a packet that includes payload information, such as for how to illuminate a particular pixel in a sweep (e.g., color intensity, duration, laser pulse size, etc.). As such, the non-control data type packet 910 includes pixel data 930 describing the mechanics of how a pixel is to be illuminated.

Whereas a single control data type packet may be sent in each new data stream across a virtual channel, there may be any number of non-control data type packets that are sent in the data stream. Furthermore, corruption of any single non-control data type packet may result in only a single pixel being corrupted. HMDs often have a refresh rate of between 90 Hz and 120 Hz and also have very high resolution rates (e.g., each image frame is megabytes in resolution quality), so corruption of a single pixel may not be noticeable by a user of the HMD. In view of those conditions, the embodiments selectively refrain from imposing ECC on the non-control data type packet 910. Errors that occur for the non-control data type packet 910 are simply accepted because the influence resulting from any such error is considered nominal.

By imposing ECC 925 on the control data type packet 905, the embodiments satisfy the real-time data requirement 805 of FIG. 8 because the ECC 925 allows for error correction and detection at the receiver node, such that a re-transmittal of the control data type packet 905 need not be performed and real-time processing may be performed. Similarly, by imposing the ECC 925 on only the control data type packet 905 but not on the non-control data type packet 910 (which typically constitute a majority of the packets transmitted in a data stream), the embodiments satisfy the low overhead requirement 810 because additional data (i.e. the ECC) is being applied to only a single packet as opposed to multiple packets. As such, the amount of additional overhead is also nominal. Additionally, by imposing the ECC, the embodiments are able to automatically recover upon detecting an error (i.e. the ECC enables errors to be automatically detected and resolved and when a new sweep happens, past errors are not imputed on new sweeps because the end condition packets informed the receiver node the data stream is complete for that sweep), such that the automatic hardware recovery requirement 825 is also satisfied. Accordingly, the embodiments impose different data protection requirements based on data type, or rather different packet type.

The end condition packet 915 is a packet used to trigger when the data stream is complete. That is, the end condition packet 915 is the last packet that is sent over the data stream after all of the non-control data type packets are transmitted. If no pixels in a particular sweep are to be illuminated by a specific laser, then it may be the case that no control data type packet or non-control data type packets are transmitted over that laser's corresponding virtual channel. Instead, only the end condition packet 915 may be sent. In some cases, to help mitigate against possible errors, a plurality of end condition packets may be transmitted. Further discussion on this feature will be provided later.

Data Streams Across Virtual Channels

Figure 11:
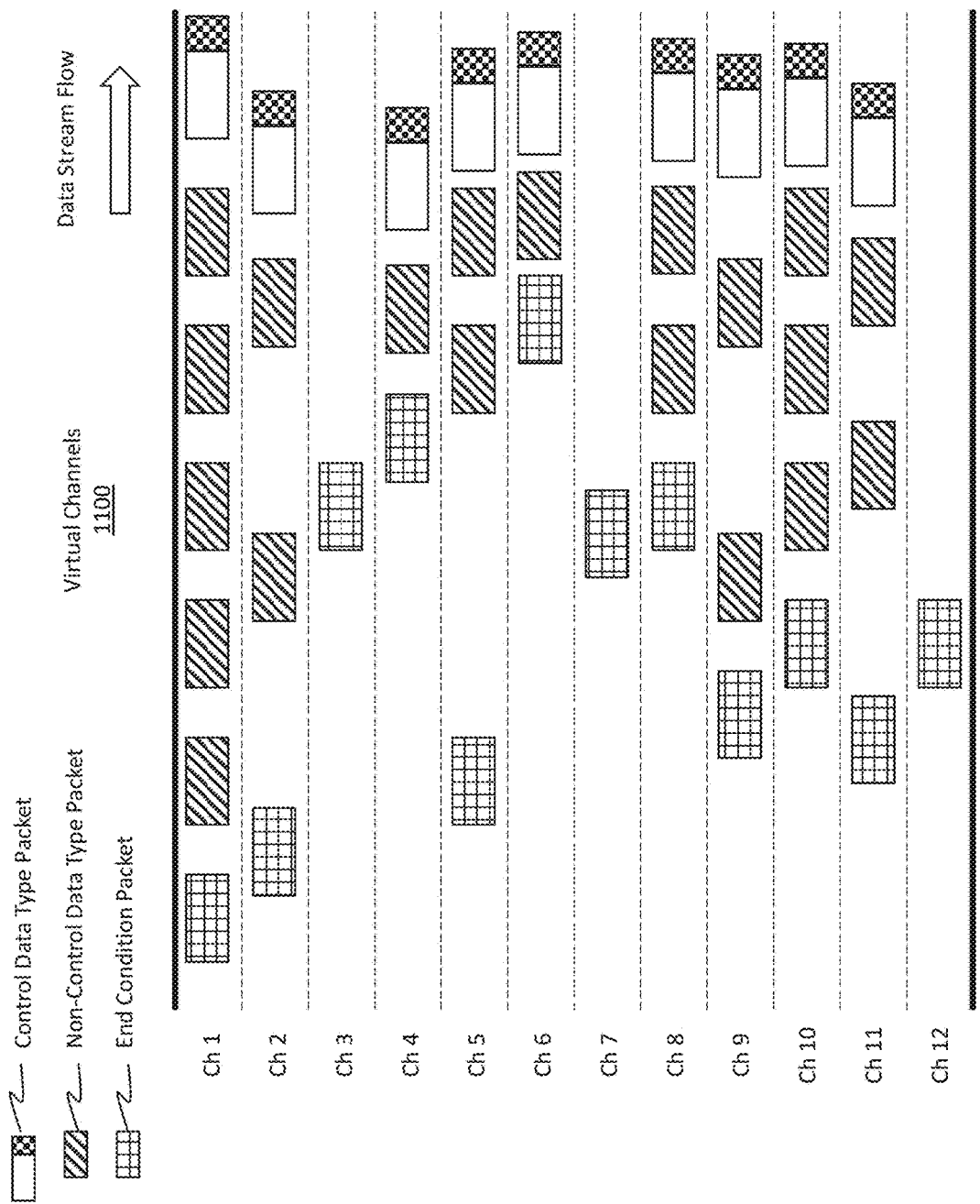
FIG. 11 illustrates how the different packet types can be transmitted over any number of virtual channels or virtual lanes.

FIG. 11 shows an example scenario involving multiple virtual channels 1100, which are representative of the virtual channels discussed thus far and which are transmitting the three different packet types introduced in FIG. 10. FIG. 11 shows a scenario in which there are 12 virtual channels, and the data stream flow is flowing from the left to the right.

Additionally, the different packet types are illustrated using different shading techniques. In this example scenario, each virtual channel corresponds to a single respective laser in the HMD, and each virtual channel has its own corresponding data stream being transmitted.

Figure 12:
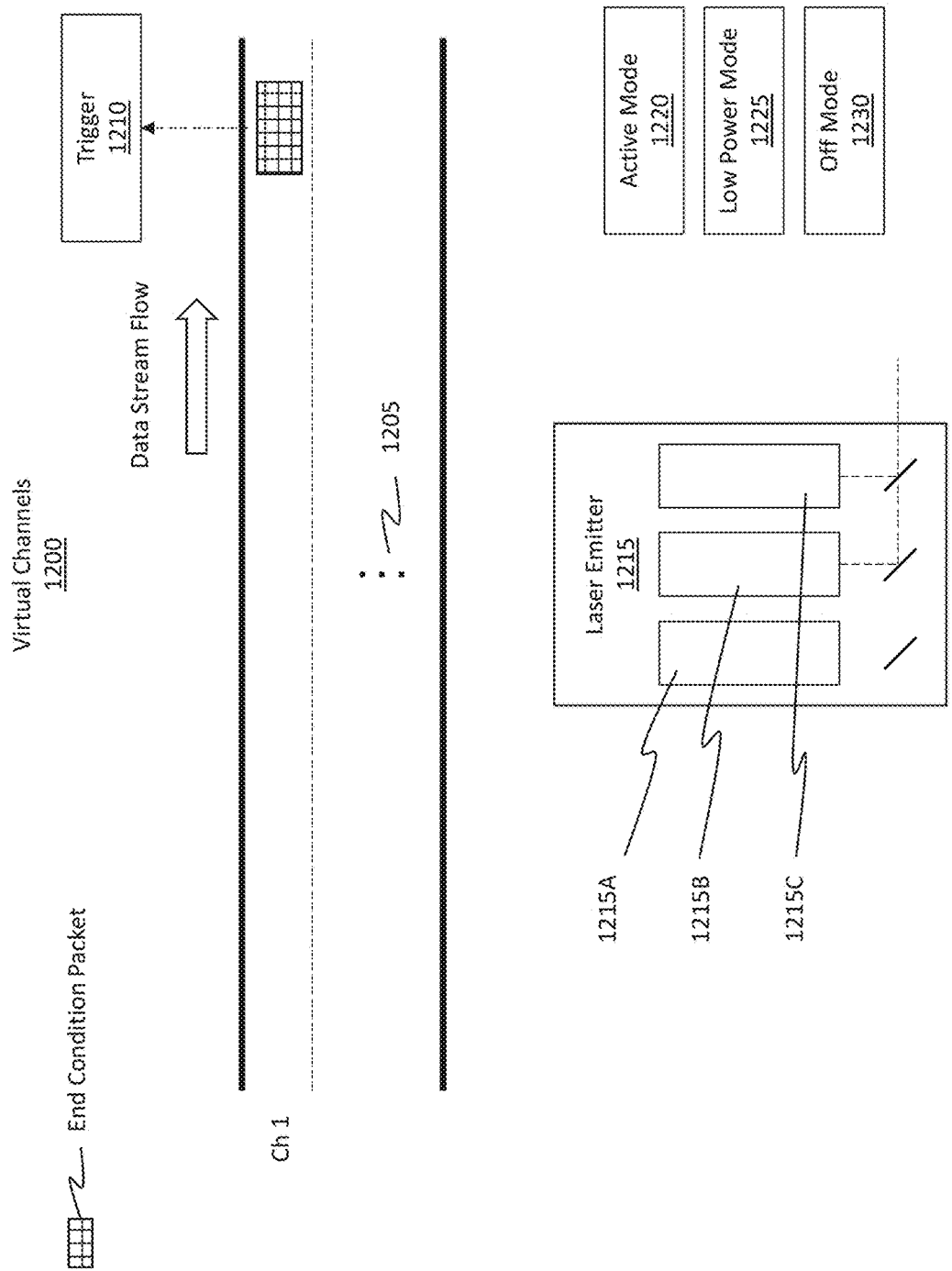
FIG. 12 illustrates a power saving technique that operates to transition nodes to a low power state when certain packets are detected.

Referring first to channel (ch.) 1, FIG. 11 shows how ch. 1's data stream starts with a control data type packet, then includes five non-control data type packets, and then includes an end condition packet. Channel 2 is similar in that it includes one control data type packet, two non-control data type packets, and an end condition packet. Channels 1 and 2 are transmitting data because the lasers corresponding to those channels will be used to illuminate pixels in a sweep. Channel 3, on the other hand, corresponds to a laser that will not be used to illuminate pixels in the sweep. As a consequence, the data stream being transmitted across ch. 3 includes only an end condition packet. This end condition packet beneficially informs the receiver node (e.g., the DMA-driving chip 615 from FIG. 6) that ch. 3's corresponding laser will not be used for this particular sweep. Accordingly, if a laser is not going to be used during a particular sweep, then the data stream transmitted for that laser's virtual channel will include only one or more end condition packets. In this regard, there may be any number of asynchronous or non-symmetric data flows being transmitted across the different virtual channels. FIG. 12 illustrates some of the benefits of using end condition packets.

Specifically, FIG. 12 focuses on virtual channels 1200, which are representative of the virtual channels 1100 of FIG. 11. For brevity purposes, only ch. 1 is being displayed, but the ellipsis 1205 symbolizes how any number of channels may be present.

FIG. 12 shows how an end condition packet has been transmitted across ch. 1. It may be the case that the end condition packet followed any number of non-control data type packets and a control data type packet or it may be the case that no non-control data type packets and control data type packet was transmitted. Regardless, the end condition packet operates as a trigger 1210 to notify that system that a corresponding power consuming node can be transitioned from a power consuming mode to a reduced power consuming mode. This triggering operation is beneficial because the system now knows the power consuming node is idle and thus can be transitioned to the reduced power consuming mode.

For instance, in the context of an HMD, the HMD includes a laser emitter 1215 that itself includes laser 1215A, 1215B, and 1215C. Channel 1 is the virtual channel corresponding specifically to laser 1215A. Transmitting the end condition packet across ch. 1 causes the system to recognize that use of the laser 1215A is now complete and thus can be transitioned from an active mode 1220 of generating laser light to either a low power mode 1225 or perhaps even an off mode 1230. The low power mode 1225 is a mode in which the laser 1215A consumes less power than the active mode 1220 because the laser 1215A is not actively generating laser light. The low power mode 1225 may be a mode in which the laser 1215A is still turned on, however. The off mode 1230, in contrast, may be a mode in which the laser is entirely turned off. Of course, these principles may be applied to any type of node, and not just to a laser.

As shown in FIG. 12, the end condition packet has triggered an operation in which the laser 1215A is now no longer emitting laser light, whereas the lasers 1215B and 1215C may still be emitting laser light. With reference to FIG. 11, transmitting the end condition packets across each of the different virtual channels enables each virtual channel's corresponding node to transition to the low power state, thereby enabling the system to preserve battery life. Furthermore, transitioning the nodes to the low power state may be performed asynchronously relative to the other virtual channels. For instance, based on the placement of the end condition packets in FIG. 11, the laser (or node) corresponding to ch. 6 will be the first laser to transition power modes. The laser (or node) corresponding to ch. 4 will be the next laser to transition power modes because its end condition packet is next in line relative to the other end condition packets that are being transmitted.

In some embodiments, multiple end condition packets are transmitted over a virtual channel to mitigate any risks that may occur from errors during transmission, which errors may result in any one particular end condition packet not being recognized as such by the receiving node. Accordingly, FIG. 13 shows a condition in which multiple end condition packets 1300 are being transmitted over a virtual channel (i.e. ch. 1).

Figure 13:
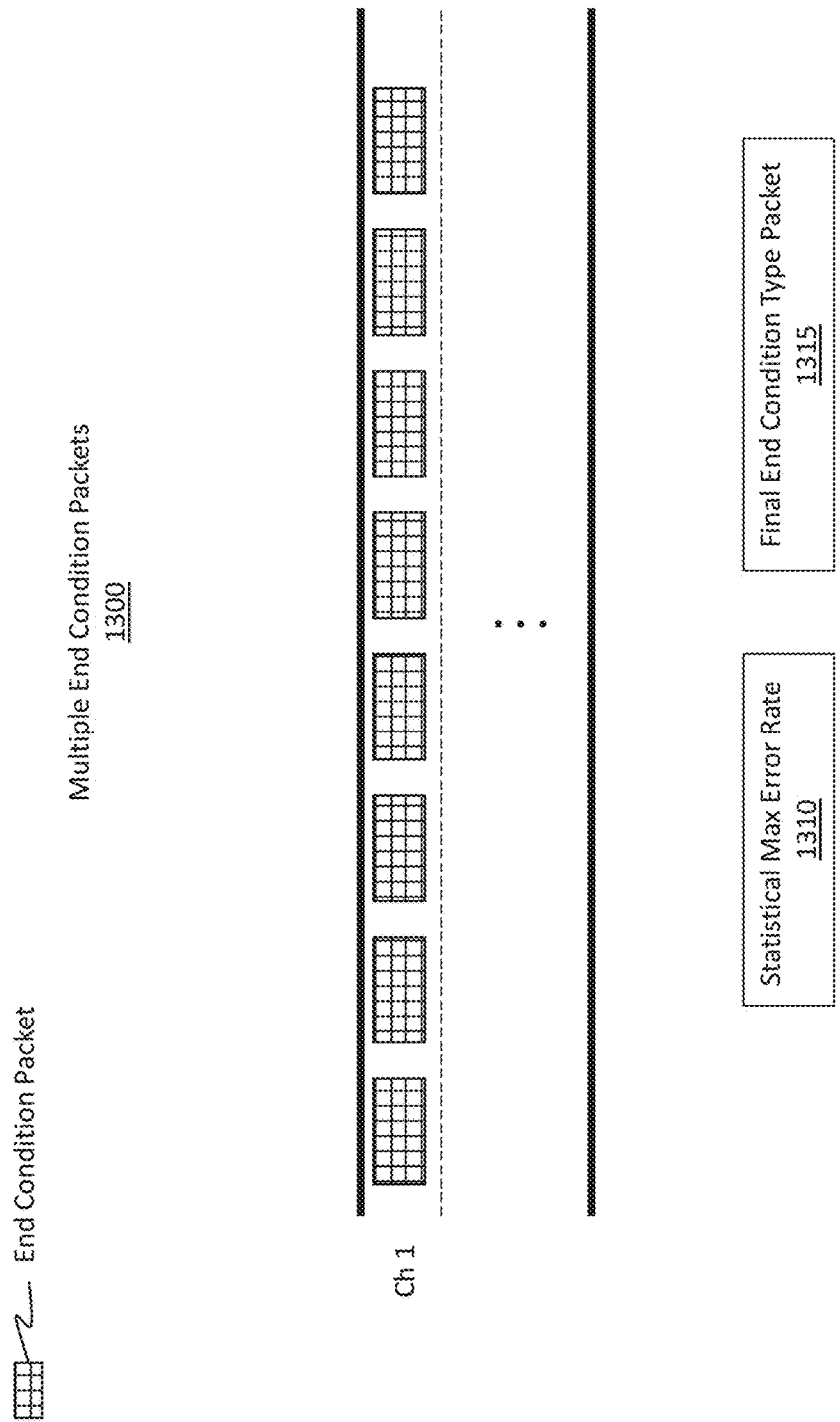
FIG. 13 illustrates how errors can be mitigated when attempting to identify the end of a data stream, where those errors are mitigated via the use of a specially configured end condition type packet. Multiple end condition type packets may be transmitted to reduce the likelihood of misidentifying the end of a data stream.

In FIG. 13, there are 8 total end condition packets that are being transmitted. Sometimes only a single end condition packet is transmitted while other times 2, 3, 4, 5, 6, 7, 8, or more than 8 end condition packets are transmitted. Either a fixed number of end condition packets may always be transmitted or a variable number of end condition packets may be transmitted, where the variable number may be based on the statistical max error rate 1310 that is detected or computed for a data stream transmitted over a virtual channel. Transmitting multiple end condition packets is often beneficial because transient errors may be introduced into any single end condition packet, making that packet either unreadable by the receiver node or undetectable as an end condition packet by the receiver node. In this regard, redundantly sending multiple end condition packets safeguards against possible error-occurring scenarios. Because each end condition packet is being provided as a triggering flag, each end condition packet may be lightweight and contain only a small amount of information. Consequently, transmitting the end condition packets over the virtual channel consumes only a negligible amount of bandwidth and resources.

Turning briefly back to FIG. 11, ch. 1 is shown as being the last channel to transmit an end condition packet. Whichever virtual lane transmits an end condition packet last, then the data stream for that virtual lane is tasked with performing a so-called wrap-up operation in which its end condition packets constitute a "final" end condition type packet 1315, as illustrated in FIG. 13. The final end condition type packet 1315 provides additional information to the receiver node indicating that all the data streams for all the other virtual lanes are also complete.

Such a feature is beneficial in the context of an HMD because the final end condition type packet 1315 also symbolizes the end of a sweep. By symbolizing the end of a sweep, the display circuitry can effectively start anew with the understanding that past errors are now done and any new errors will be associated with the line of pixels in the new sweep. Additionally, the final end condition type packet 1315 can operate to inform any nodes that were previously transitioned to a low power state to begin a ramp up process of transitioning back to the active state, if a ramp up period is needed for those nodes.

Figure 14:
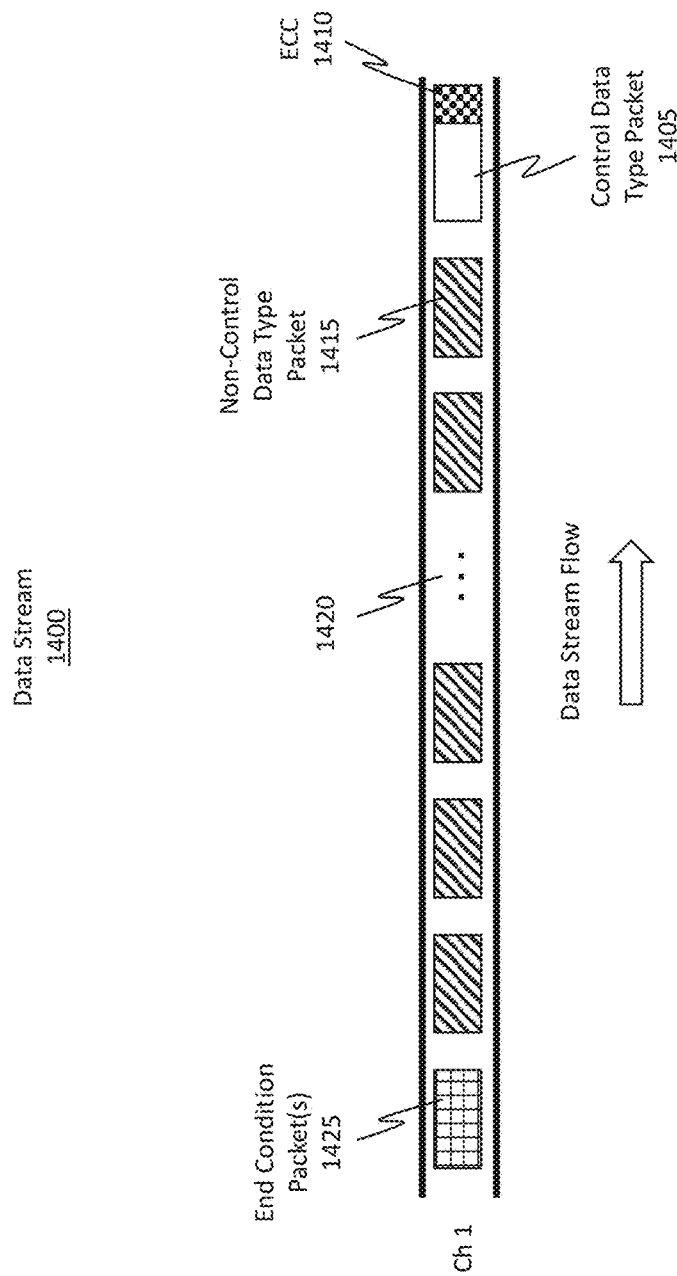
FIG. 14 illustrates an example of a data stream that includes the different types of packets.

FIG. 14 shows a summary view of a data stream 1400 in accordance with the principles discussed thus far. Data stream 1400 is being transmitted over ch. 1 and includes a control data type packet 1405 as the leading or first packet, which control data type packet 1405 is protected using ECC

1410. Subsequent to the control data type packet 1405, the data stream includes a non-control data type packet 1415, which is not protected using ECC. If errors were to occur on the non-control data type packet 1415, any such errors are allowed and considered acceptable without re-transmittal. The ellipsis 1420 indicates how any number of non-control data type packets may be transmitted in the data stream 1400. After the last non-control data type packet is transmitted, the data stream 1400 includes one or more end condition packet(s) 1425 that inform the receiver node the data stream 1400 is complete and that operate as a notice that ch. 1's corresponding node can transition to a low power state to thereby preserve battery. Accordingly, the embodiments further satisfy the low power requirement 815 of FIG. 8 by selectively and incrementally transitioning nodes to low power states in response to one or more end condition packets being transmitted over a virtual channel.

Figure 15:
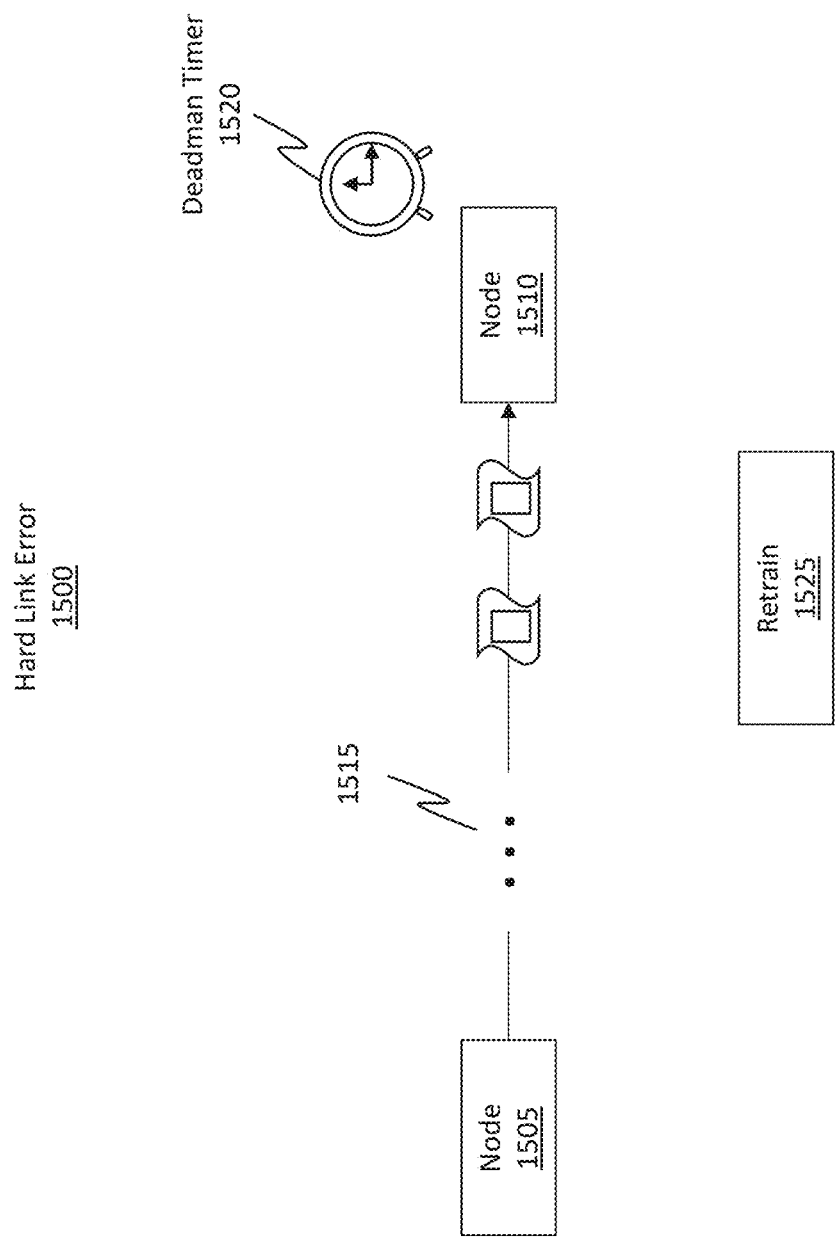
FIG. 15 illustrates how a receiver node can be configured to include a deadman timer.

FIG. 15 shows an example scenario in which the embodiments are able to respond to a hard link error 1500 in which the physical channel between two nodes may become corrupted (e.g., a hard high or low pull), shorted, an input/output I/O issue, a physical chip error, or even physically broken. Specifically, FIG. 15 shows two nodes, node 1505 and node 1510, both of which are representative of the nodes discussed thus far. In this example, node 1505 is a transmitter node and node 1510 is the receiver node. In accordance with the principles discussed thus far, node 1505 is sending any number of packets to the node 1510.

Now, however, there is a hard link error 1500 on the channel or virtual channel. The ellipsis 1515 symbolizes the lack of continued transmittal of packets over a period of time. In some cases, the nodes 1505 and 1510 may not be able to directly detect the occurrence of the hard link error 1500. As such, the embodiments configure the node 1510 (i.e. the receiver node) to include a so-called deadman timer 1520. This deadman timer 1520 may be triggered upon the initial receipt of packets in a data stream. The deadman timer 1520 can continue to elapse time until a threshold amount of time has been reached. This threshold amount of time can be set to any value but will typically be a value that is substantially larger than time values usually used to transmit data streams. For example, the duration of the threshold time period may be based on past historical trends for data streams. For instance, the threshold time period may be set to 2×, 3×, 4×, or perhaps even 5× the historically identified average period of time in which data streams are transmitted. From this, one will appreciate how the deadman timer 1520 may be used to identify when some error has occurred. That is, if the threshold period of time used by the deadman timer 1520 elapses after initial receipt of a packet, then the node 1510 can determine that there may be a hard link error 1500.

In some cases, the deadman timer 1520 is triggered when any packet is received via any one of the virtual channels or other channels existing between the node 1505 and 1510. In some cases, the deadman timer 1520 may be triggered in response to some other indication in the system, where the indication indicates that the node 1510 should be receiving packets but currently is not. Accordingly, the receiver node may include the deadman timer 1520, which helps the system identify hard link errors 1500 and which triggers a timeout for receiving packets from the transmitter node. In this manner, the hardware is able to automatically detect hard link errors.

FIG. 15 also shows an optional retrain 1525 operation. When a bus/channel is initially used, it often undergoes an initial training or calibration operation to identify an "i" (i.e. current) that produces the lowest possible error rate on the wire for data that is transmitted over the wire. For instance, the calibration is performed to identify differences between a "0" bit on the line and a "1" bit on the line. The "i" mentioned above refers to the amount of current above or below a threshold that is needed in order to represent a "1" and how much current below the threshold is needed in order to represent a "0." When performing this initial calibration, the system is able to skew or modify the wire, link, or channel to try to lower the probability of error by making "i" larger. The larger the "i," the bigger the current difference is required to represent a "1" or a "0." Performing this calibration helps prevent a "0" from being identified as being a "1" and vice-versa on the wire.

In some cases (though perhaps not for cases involving an actual break to the wire), the embodiments are able to trigger the retrain 1525 operation to occur to re-train or re-calibrate the "i" value listed earlier. For instance, if the node 1510 identifies a threshold number of packets that have errors, then the node 1510 can trigger the retrain 1525 operation. In some specific implementations, the ECC may be triggered to correct a control data type packet, and the triggering of the ECC may be further configured to trigger the retraining of the hard link. As discussed earlier, the ECC (which may trigger the retraining process) can be utilized for errors that are determined to be correctable based on the design constraints of the ECC. For instance, if the ECC is designed to correct single bit errors and detect double bit errors, then single bit errors will be corrected and double bit errors will be detected. Likewise, if the ECC is designed to correct x-bit errors and detect x+1-bit errors, then x-bit errors will be corrected and x+1-bit errors will be detected. Accordingly, the disclosed principles should not be limited to any specific type of ECC or error.

The retain 1525 operation can be scheduled to occur during the vblank period that was mentioned earlier. As discussed earlier, the vblank time often consumes about 20% of the time scheduled for a frame, so the retrain 1525 operation can be performed during this time period prior to the illumination of a new frame.

Accordingly, the embodiments are able to use any ECC-corrected errors to operate as a notice that the hard link may need to be retrained in the manner described above. This retraining process may be performed automatically (e.g., perhaps by the hardware) during the vblank time period in which the nodes/lasers are typically idle such that no data transmissions are occurring on the virtual channels.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 16:
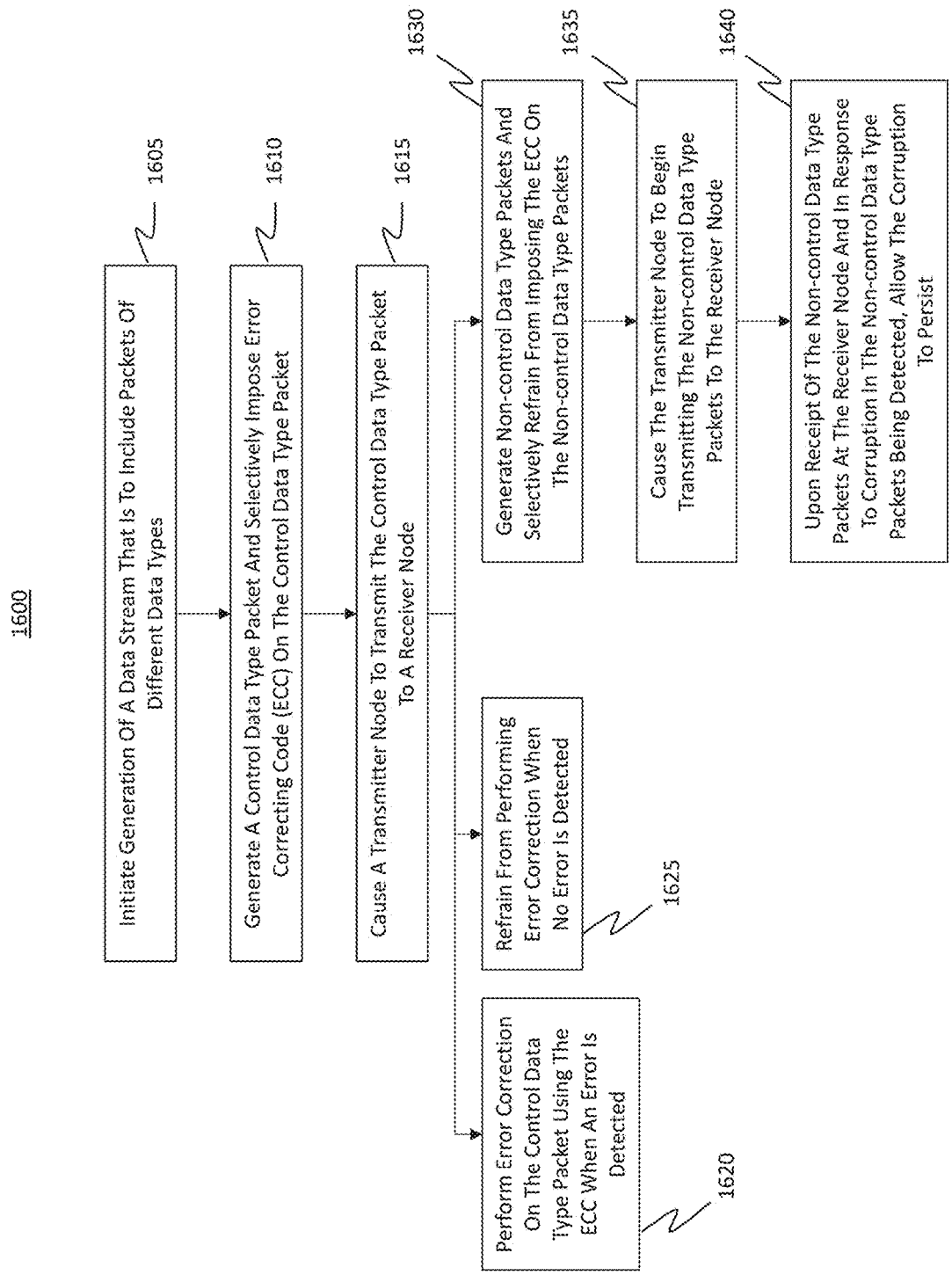
FIG. 16 illustrates a flowchart of an example method for improving transmissions between a transmitter node and a receiver node via a high-speed high-bandwidth link by recovering from an error condition without requiring a re-transmittal of data.

Attention will now be directed to FIG. 16, which illustrates a flowchart of an example method 1600 that may be performed by a computer system or even any of the HMDs discussed thus far. Method 1600 is configured to improve transmissions between a transmitter node and a receiver node via a high-speed high-bandwidth link. These improvements are achieved by recovering from an error condition without requiring a re-transmittal of data across the link. Additionally, the embodiments are able to isolate a misbehaving or error-prone channels (e.g., a physical channel or a virtual channel) so that the error-prone channel does not impact other channels (virtual or otherwise). Notably, the system (e.g., any type of computer system, including an HMD) includes the transmitter node and the receiver node connected via the hard link. By way of example, the transmitter node may be the DPP chip 610 from FIG. 6, and the receiver node may be the DMA-driving chip 615 of the HMD 600. Of course, other types of nodes may be used as well.

Initially, method 1600 includes an act (act 1605) of initiating generation of a data stream that is to include packets of different data types, including a control data type and a non-control data type. For instance, the data stream 220 from FIG. 2 may be representative of the data stream in act 1605, and the control data type packet 905 and the non-control data type packet 910 from FIG. 9 are representative of the packets discussed in act 1605.

Method 1600 also includes an act (act 1610) of generating a control data type packet (e.g., the control data type packet 905 from FIG. 9) and selectively imposing error correcting code (ECC) (e.g., ECC 925 from FIG. 9) on the control data type packet. This ECC is configured to enable errors occurring in the control data type packet to be corrected at the receiver node. As a consequence, re-transmittal of the control data type packet is prevented and the hardware is able to automatically recover from the error without a re-transmittal. The ECC on the control data type packet is configured to perform single bit error correction and double bit error detection (i.e. SECDED). In some cases, the ECC is designed to perform x-bit error correction and x+1-bit error detection, as recited earlier.

Method 1600 also includes an act (act 1615) of causing the transmitter node to transmit the control data type packet to the receiver node. For instance, FIG. 11 shows how a control data type packet is transmitted over channel 1. Additionally, each channel or virtual channel may have its own corresponding data stream. One will appreciate how the transmission may occur over a virtual channel or a physical channel that is not virtual. Indeed, the embodiments may be practiced using any type of channel without limit.

Upon receipt of the control data type packet at the receiver node, a number of operations may be performed. For instance, act 1620 shows how the method 1600 includes performing error correction on the control data type packet using the ECC when an error is detected. Alternatively, act 1625 shows how the method 1600 includes refraining from performing error correction when no error is detected. Notably, when ECC is performed, this ECC is performed without impacting data streams that may be flowing across the other channels or virtual channels. To clarify, by practicing the disclosed principles, an error on one channel (be it virtual or otherwise) will not impact the operations of the other channels.

In parallel or even in series with acts 1620 or 1625, method 1600 shows an act (act 1630) of generating non-control data type packets (e.g., non-control data type packet 910 from FIG. 9). The non-control data type packets include pixel data (laser color, color intensity, shape of the laser pulse, etc.) used to display content. Act 1630 also includes selectively refraining from imposing the ECC on the non-control data type packets.

For instance, FIG. 11 shows how ECC is imposed on only the control data type packets while no ECC is imposed on the non-control data type packets, which packets typically represent a majority of the packets in the data stream. The process of selectively refraining from imposing the ECC on the non-control data type packets operates to reduce bandwidth usage over the hard link as compared to imposing ECC on the non-control data type packets. Because there is usually only a single control data type packet in each data stream, imposing the ECC on that packet will have only a nominal impact on bandwidth and resource usage.

The transmitter node is then caused (act 1635) to begin transmitting the non-control data type packets to the receiver node. Upon receipt of the non-control data type packets at the receiver node and in response to corruption (i.e. an error) in one or more of the non-control data type packets being detected, method 1600 includes an act (act 1640) of allowing the corruption to persist.

Whereas an uncorrected error to the control data type packet may result in an entire sweep of pixels being corrupted and causing artifacts, an error to a non-control data type packet often results in corruption of only a single pixel of an HMD. A single pixel artifact is often not even noticeable at the refresh rates used by the HMD. For non-HMD implementations, corruption of the non-control data type packets may also be negligible. The receiver node is able to automatically recover when a single or multibit error is detected in a particular one of the non-control data type packets by accepting the error for a period of time (e.g., a time period associated with a sweep) and then resetting error flags for a new sweep.

Accordingly, by performing the above operations, the embodiments are able to selectively recover from some errors in a data stream (e.g., errors occurring on the control data type packet) without requiring re-transmittal of the packets. Such operations enable the embodiments to satisfy real-time requirements for data packets, thereby improving the operational efficiency of the system while also reducing bandwidth usage of the virtual channels.

Figure 17:
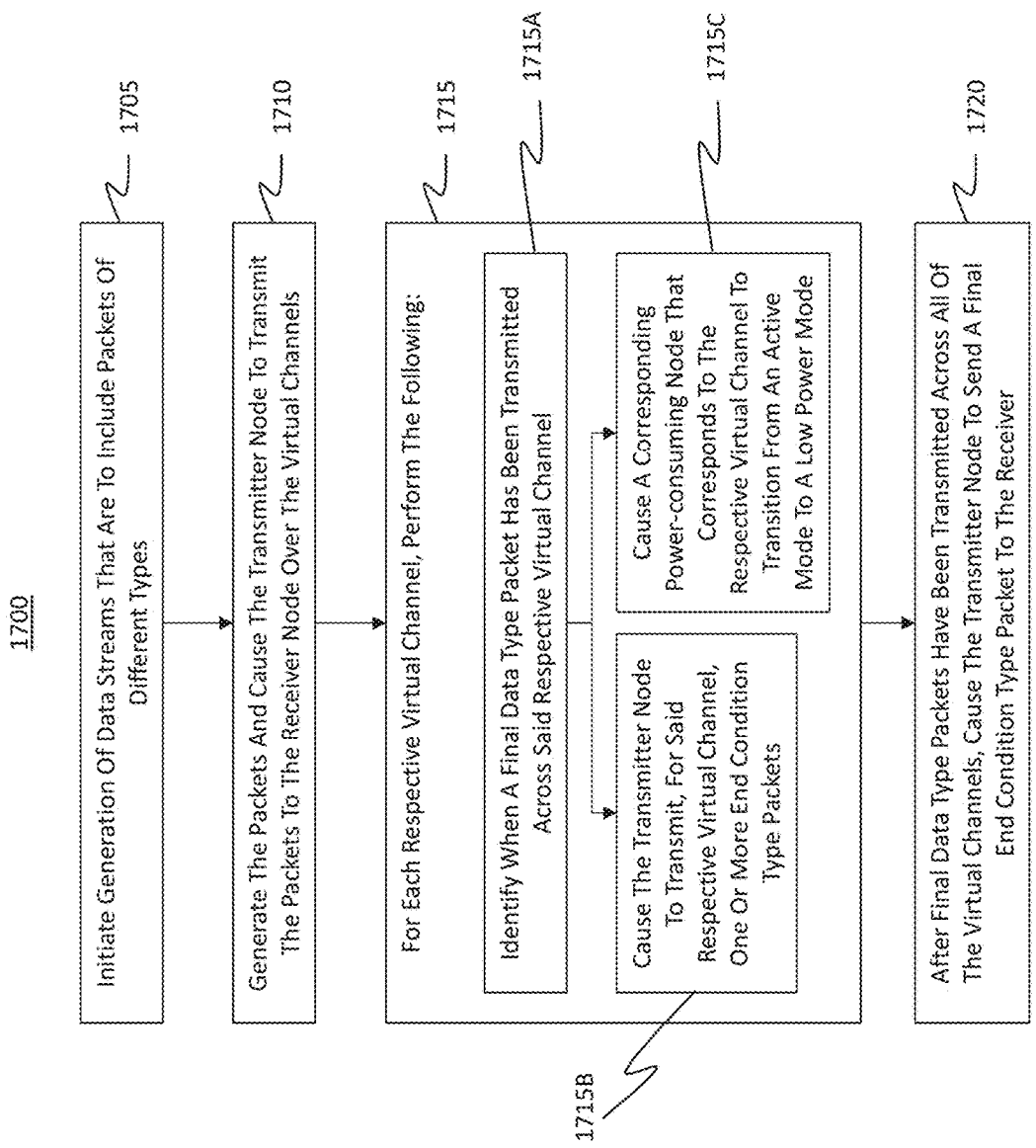
FIG. 17 illustrates a flowchart of an example method for improving power usage by identifying when packet transmissions across virtual channels are complete and by causing nodes to enter a low power state when those packet transmissions are complete.

FIG. 17 illustrates a flowchart of an example method 1700 that may also be performed by any type of computer system, including an HMD. Method 1700 is configured to improve power usage by identifying when packet transmissions across virtual channels are complete and by causing nodes to enter a low power state/mode when those packet transmissions are complete. The computer system also includes a transmitter node and a receiver node (e.g., any of the nodes discussed thus far) connected via a hard link. Here, multiple virtual channels are initialized on the hard link, and each virtual channel is associated with a corresponding power-consuming node (e.g., perhaps a laser).

Method 1700 initially includes an act (act 1705) of initiating generation of data streams that are to include packets, some of which include different types, including data type packets and end condition type packets. For instance, each data stream may include either only end condition packets or, alternatively, a combination of one control data type packet, any number of non-control data type packets, and a selected number of end condition packets. To clarify, the data type packets may include a control data type packet 905 of FIG. 9 and a non-control data type packet 910 (or any number of such packets). The end condition type packet may be the end condition packet 915 of FIG. 9. As discussed earlier, ECC may be imposed on one or more of the data type packets (e.g., the control data type packets) but is not imposed on any of the end condition type packets.

Method 1700 also includes an act (act 1710) of generating the packets and causing the transmitter node to transmit the packets to the receiver node over the virtual channels. Each virtual channel transmits its own corresponding data stream configured in the manner described above such that each virtual channel transmits one or more of the different types of packets.

For each respective virtual channel included in the plurality of virtual channels, a number of operations are then performed as represented by act 1715. Specifically, act 1715A includes identifying when a final data type packet has been transmitted across each respective virtual channel. After act 1715A, there is an act 1715B of causing the transmitter node to transmit (for each respective virtual channel) one or more end condition type packets. In some implementations, the one or more end condition type packets that are transmitted include multiple end condition type packets. Determining how many end condition type packets are to be transmitted may be based on different factors, including a statistical max error rate, detected environmental conditions that may cause an increased likelihood of transient errors, and others. In some cases, at least 8 different end condition type packets are transmitted for each respective virtual channel. In some cases, different numbers of end condition type packets may be sent for each of the different virtual channels (e.g., one channel may have 4 end condition type packets sent through it while another channel may have 16 end condition type packets sent through it). The redundancy of sending multiple end condition type packets protects against errors that may occur for any one or more of those packets.

Also after act 1715A, there is an act 1715C of causing a corresponding power-consuming node that corresponds to that respective virtual channel to transition from a powered or active state/mode to a low power state/mode. An example will be helpful.

FIG. 11 shows multiple virtual channels, each transmitting its own corresponding data stream. A data stream may include a combination of control data type packets, non-control data type packets, and end condition packets or, alternatively only end condition packets. In accordance with act 1715A and with reference to ch. 1, the embodiments are able to identify when the last non-control data type packet is sent (e.g., in ch. 1 the last non-control data type packet is the fifth from the right). In response to that identification step, the embodiments are able to cause the transmitter node to transmit an end condition packet (or perhaps multiple end condition packets). Additionally, as shown in FIG. 12, the embodiments are able to cause a corresponding node (e.g., laser 1215A corresponds to ch. 1) to transition from the active mode 1220 to a low power mode 1225 or even an off mode 1230.

Returning to FIG. 17, after the final or last data type packets have been transmitted across all of the virtual channels, method 1700 includes an act (act 1720) of causing the transmitter node to send a final end condition type packet to the receiver. The final end condition type packet informs the receiver that the data stream is complete not only for that specific virtual channel but for all of the other virtual channels as well. The final end condition type packet mentioned in act 1720 is representative of the final end condition type packet 1315 of FIG. 13. In some cases, the final end condition type packet is transmitted over a particular virtual channel that is last to transmit its non-control data type packets as compared to other ones of the virtual channels that also transmitted packets.

As discussed above, in some embodiments, the power-consuming nodes that correspond to the plurality of virtual channels are lasers. Furthermore, the final end condition type packet may further inform the receiver node that data streams on other ones of the virtual channels in the plurality of virtual channels are also complete.

Some embodiments are able to perform a combination of the acts recited in both method 1600 of FIG. 16 and method 1700 of FIG. 17. None of the disclosed features are mutually exclusive and any feature recited in this disclosure may be combined with any other feature, without limit.

Accordingly, the disclosed embodiments operate to improve data transmissions and also to improve power efficiency. To improve the data transmissions, the embodiments selectively apply ECC to only a specific type of packet and refrain from applying the ECC to other types of packets. Doing so results in only a nominal increase to resource usage yet results in substantial benefits because now re-transmitting packets that have become corrupted can be avoided. The embodiments also beneficially transition nodes to low power states upon identifying conditions in which specific types of packets are detected in a data stream.

Example Computer/Computer Systems

Figure 18:
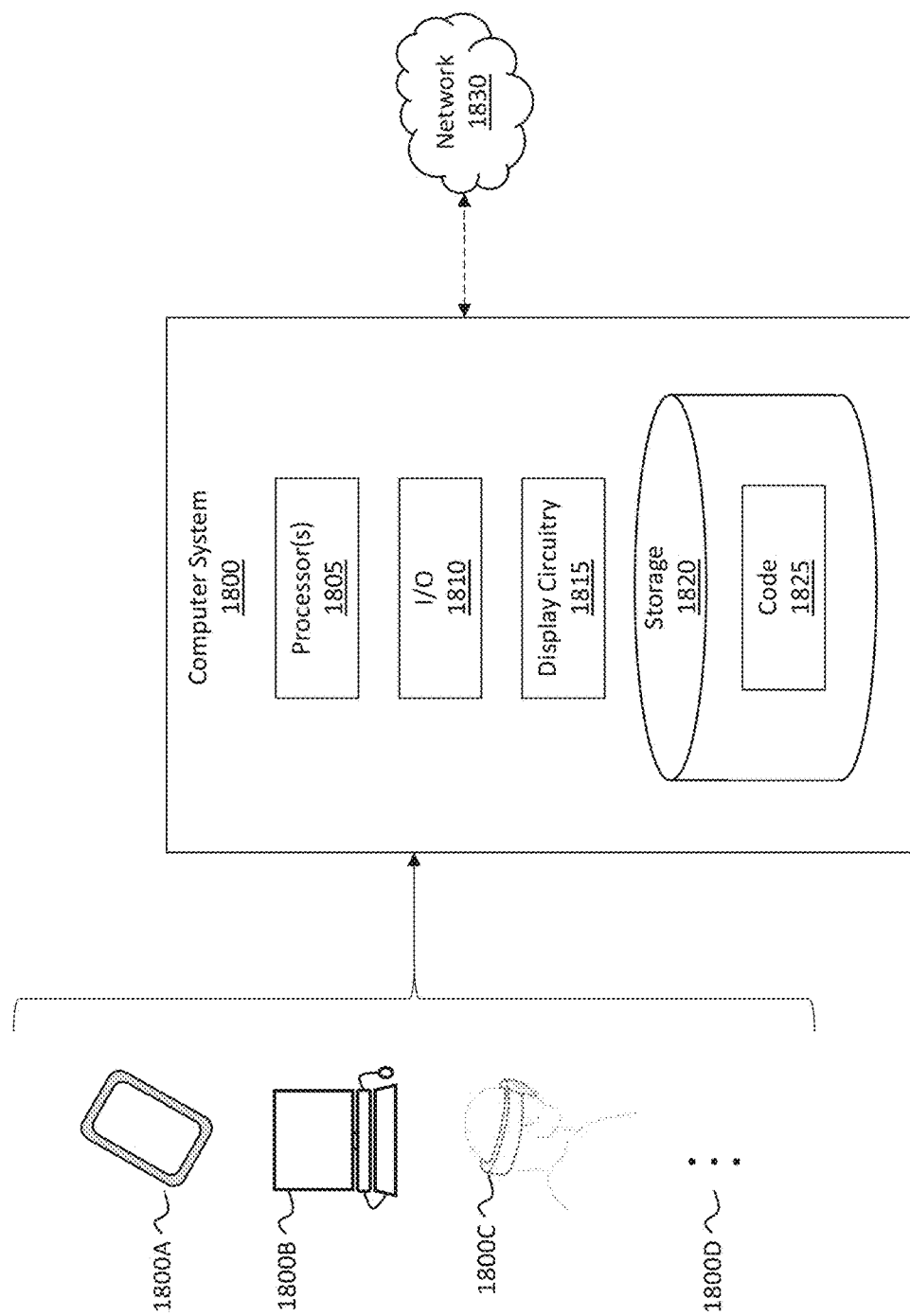
FIG. 18 illustrates an example computer system configured to be able to perform any of the disclosed operations.

Attention will now be directed to FIG. 18 which illustrates an example computer system 1800 that may include and/or be used to perform any of the operations described herein. Computer system 1800 may take various different forms. For example, computer system 1800 may be embodied as a tablet 1800A, a desktop or a laptop 1800B, a wearable device (e.g., HMD 1800C, which is representative of the HMDs discussed thus far), a mobile device, or any other type of standalone device as represented by the ellipsis 1800D. Computer system 1800 may also be a distributed system that includes one or more connected computing components/devices that are in communication with computer system 1800.

In its most basic configuration, computer system 1800 includes various different components. FIG. 18 shows that computer system 1800 includes one or more processor(s) 1805 (aka a "hardware processing unit"), input/output I/O 1810, display circuitry 1815, and storage 1820.

Regarding the processor(s) 1805, it will be appreciated that the functionality described herein can be performed, at least in part, by one or more hardware logic components (e.g., the processor(s) 1805). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The I/O 1810 may include any type of input or output device. Examples include, but are not limited to, displays, keyboards, mouse, stylus, joystick, touchscreens, and so forth without limit. The display circuitry 1815 is representative of the display circuitry 605 from FIG. 6.

As used herein, the terms "executable module," "executable component," "component," "module," or "engine" can refer to hardware processing units or to software objects, routines, or methods that may be executed on computer system 1800. The different components, modules, engines, and services described herein may be implemented as objects or processors that execute on computer system 1800 (e.g. as separate threads).

Storage 1820 may be physical system memory, which may be volatile, non-volatile, or some combination of the two. The term "memory" may also be used herein to refer to non-volatile mass storage such as physical storage media. If computer system 1800 is distributed, the processing, memory, and/or storage capability may be distributed as well.

Storage 1820 is shown as including executable instructions (i.e. code 1825). The executable instructions represent instructions that are executable by the processor(s) 1805 of computer system 1800 to perform the disclosed operations, such as those described in the various methods.

The disclosed embodiments may comprise or utilize a special-purpose or general-purpose computer including computer hardware, such as, for example, one or more processors (such as processor(s) 1805) and system memory (such as storage 1820), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1800 may also be connected (via a wired or wireless connection) to external sensors (e.g., one or more remote cameras) or devices via a network 1830. For example, computer system 1800 can communicate with any number devices or cloud services to obtain or process data. In some cases, network 1830 may itself be a cloud network. Furthermore, computer system 1800 may also be connected through one or more wired or wireless networks to remote/separate computer systems(s) that are configured to perform any of the processing described with regard to computer system 1800.

A "network," like network 1830, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1800 will include one or more communication channels that are used to communicate with the network 1830. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for recovering from an error condition, said method comprising:
   causing a data stream to include packets of different data types, including a first data type and a second data type;
   generating a first data type packet;
   selectively imposing error correcting code (ECC) on the first data type packet, the ECC enabling errors that occur in the first data type packet to be corrected using data in the first data type packet;
   transmitting the first data type packet using the data stream;
   generating a second data type packet; and
   transmitting the second data type packet using the data stream.

2. The method of claim 1, wherein the first data type is a control data type.

3. The method of claim 1, wherein the second data type is a non-control data type.

4. The method of claim 1, wherein the first data type is a control data type, and wherein the second data type is a non-control data type.

5. The method of claim 1, wherein the ECC on the first data type packet performs a single bit error correction.

6. The method of claim 1, wherein the ECC on the first data type packet performs a double bit error detection.

7. The method of claim 1, wherein the ECC on the first data type packet performs at least one of a single bit error correction or a double bit error detection.

8. The method of claim 1, wherein the ECC is 8 bits.

9. The method of claim 1, wherein packets of the second data type constitute a majority of packets transmitted in the data stream.

10. The method of claim 1, wherein packets of the first data type constitute a minority of packets transmitted in the data stream.

11. A computer system that enables packet recovery from an error condition, said computer system comprising:
   one or more processors; and
   one or more hardware storage devices that store instructions that are executable by the one or more processors to cause the computer system to:
      cause a data stream to include packets of different data types, including a first data type and a second data type;
      generate a first data type packet;
      selectively impose error correcting code (ECC) on the first data type packet, the ECC enabling errors that occur in the first data type packet to be corrected using data in the first data type packet;
      transmit the first data type packet using the data stream;
      generate a second data type packet; and
      transmit the second data type packet using the data stream.

12. The computer system of claim 11, wherein the second data type packet includes pixel data.

13. The computer system of claim 11, wherein an automatic recovery occurs when a multibit error is detected in the second data type packet.

14. The computer system of claim 11, wherein the first data type is a control data type.

15. The computer system of claim 11, wherein the second data type is a non-control data type.

16. The computer system of claim 11, wherein the ECC on the first data type packet performs one of a single bit error correction or a double bit error detection.

17. The computer system of claim 11, wherein packets of the second data type constitute a majority of packets transmitted in the data stream.

18. A method for recovering packet data from an error condition, said method comprising:
   causing a data stream to include one or more packets of a first data type and one or more packets of a second data type;
   generating a first data type packet;
   selectively imposing error correcting code (ECC) on the first data type packet, the ECC enabling errors that occur in the first data type packet to be corrected using data in the first data type packet;
   transmitting the first data type packet using the data stream;
   generating a second data type packet; and
   transmitting the second data type packet using the data stream.

19. The method of claim 18, wherein the first data type is a control data type, and wherein the second data type is a non-control data type.

20. The method of claim 18, wherein the ECC on the first data type packet performs at least one of a single bit error correction or a double bit error detection.

* * * * *